US012496844B2

(12) United States Patent
Ukai et al.

(10) Patent No.: US 12,496,844 B2
(45) Date of Patent: Dec. 16, 2025

(54) AUXILIARY TAPE CASSETTE PROVIDED WITH CASE HAVING GUIDE SURFACE AROUND WHICH PRINTING TAPE IS WRAPPED TO FORM SPIRAL PORTION

(71) Applicant: BROTHER KOGYO KABUSHIKI KAISHA, Nagoya (JP)

(72) Inventors: Shinji Ukai, Kiyosu (JP); Kosuke Higashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 173 days.

(21) Appl. No.: 18/188,241

(22) Filed: Mar. 22, 2023

(65) Prior Publication Data

US 2023/0219357 A1 Jul. 13, 2023

Related U.S. Application Data

(63) Continuation of application No. PCT/JP2021/034289, filed on Sep. 17, 2021.

(30) Foreign Application Priority Data

Sep. 30, 2020 (JP) ................................ 2020-164712

(51) Int. Cl.
*B41J 32/00* (2006.01)
*B41J 33/22* (2006.01)
*B41J 35/04* (2006.01)

(52) U.S. Cl.
CPC ............... *B41J 32/00* (2013.01); *B41J 33/22* (2013.01); *B41J 35/04* (2013.01)

(58) Field of Classification Search
CPC ... B41J 15/04; B41J 33/14; B41J 35/28; B41J 17/32; B41J 2/325; B41J 3/36; B41J 32/00
See application file for complete search history.

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

CN 102092201 A 6/2011
CN 103273748 A 9/2013
(Continued)

OTHER PUBLICATIONS

International Search Report for PCT/JP2021/034289 dated Oct. 26, 2021.

(Continued)

*Primary Examiner* — John P Zimmermann
(74) *Attorney, Agent, or Firm* — KENEALY VAIDYA LLP

(57) ABSTRACT

An auxiliary tape cassette includes a roll configured of a wound auxiliary tape and a case housing the roll. The auxiliary tape is for printing on a printing tape. The case has a discharge port for discharging the printing tape and a guide surface for guiding the printing tape toward the discharge port. The guide surface is defined on an inner surface or an outer surface of the case. The printing tape is wrapped around the guide surface to form a spiral portion whose angle of rotation about a central axis of the spiral portion is greater than or equal to 180 degrees. The central axis is parallel to a winding axis of the roll. The guide surface includes a curved surface for guiding at least a portion of the spiral portion on an upstream side of the discharge port in a discharging direction of the printing tape.

13 Claims, 21 Drawing Sheets

(56) References Cited

U.S. PATENT DOCUMENTS

| | | | | |
|---|---|---|---|---|
| 3,823,808 | A | 7/1974 | Murata et al. | |
| 3,948,382 | A | 4/1976 | Nesbitt et al. | |
| 4,034,935 | A | 7/1977 | Plaza et al. | |
| 4,252,450 | A | 2/1981 | Goodman et al. | |
| 4,351,619 | A | 9/1982 | Duke et al. | |
| 4,397,574 | A | 8/1983 | Wojdyla | |
| 4,402,619 | A | 9/1983 | Paque et al. | |
| 4,490,059 | A | 12/1984 | Daughters | |
| 4,499,513 | A | 2/1985 | Umeda | |
| 4,538,931 | A | 9/1985 | Nagashima | |
| 4,565,128 | A | 1/1986 | Moriyama et al. | |
| 4,598,780 | A | 7/1986 | Iwasaki et al. | |
| 4,668,961 | A | 5/1987 | Hiramatsu | |
| 4,832,514 | A | 5/1989 | Basile | |
| 4,856,921 | A | 8/1989 | Hatakeyama | |
| 5,099,378 | A | 3/1992 | Turgeon | |
| 5,145,268 | A | 9/1992 | Cavallini | |
| 5,325,114 | A | 6/1994 | Fogle et al. | |
| 5,402,954 | A | 4/1995 | Skavnak et al. | |
| 5,435,657 | A | 7/1995 | Pearce et al. | |
| 5,472,286 | A | 12/1995 | Uemura et al. | |
| 5,533,818 | A * | 7/1996 | Bahrabadi | B41J 11/009 400/208 |
| 5,618,119 | A | 4/1997 | Misu et al. | |
| 5,619,244 | A | 4/1997 | Manna | |
| 5,645,360 | A | 7/1997 | Iwane et al. | |
| 5,795,085 | A * | 8/1998 | Yoo | B65H 37/007 156/577 |
| 5,917,532 | A | 6/1999 | Cornell et al. | |
| 5,959,652 | A | 9/1999 | Privin | |
| 6,190,067 | B1 * | 2/2001 | Kobayashi | B26D 5/16 400/208 |
| 6,511,238 | B1 | 1/2003 | Glize | |
| 2007/0172286 | A1 | 7/2007 | Pomfret | |
| 2007/0172293 | A1 | 7/2007 | Vandermeulen | |
| 2008/0084494 | A1 | 4/2008 | Pomfret | |
| 2014/0307038 | A1 * | 10/2014 | Niizeki | B41J 15/044 347/214 |
| 2015/0283835 | A1 | 10/2015 | Sakano et al. | |
| 2017/0066265 | A1 * | 3/2017 | Iwashita | B41J 2/325 |
| 2017/0190195 | A1 | 7/2017 | Kosuge et al. | |
| 2020/0207115 | A1 | 7/2020 | Ishimoto et al. | |
| 2023/0294431 | A1 | 9/2023 | Higashi et al. | |
| 2023/0356537 | A1 | 11/2023 | Higashi et al. | |

FOREIGN PATENT DOCUMENTS

| | | | |
|---|---|---|---|
| CN | 106132715 | A | 11/2016 |
| CN | 107073982 | A | 8/2017 |
| CN | 111376619 | A | 7/2020 |
| CN | 116234704 | A | 6/2023 |
| CN | 116802060 | A | 9/2023 |
| EP | 0414544 | A2 | 2/1991 |
| GB | 2016411 | A | 9/1979 |
| JP | S50-36734 | B1 | 11/1975 |
| JP | S52-064310 | A | 5/1977 |
| JP | S54-111914 | A | 9/1979 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | U | 7/1993 |
| JP | H06-183117 | A | 7/1994 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-090877 | A | 4/1996 |
| JP | H08-183204 | A | 7/1996 |
| JP | H08-183232 | A | 7/1996 |
| JP | H11-240232 | A | 9/1999 |
| JP | 2000-103149 | A | 4/2000 |
| JP | 2001-047713 | A | 2/2001 |
| JP | 2001130116 | A | 5/2001 |
| JP | 2002-211092 | A | 7/2002 |
| JP | 2004-255656 | A | 9/2004 |
| JP | 2007-502221 | A | 2/2007 |
| JP | 2008-261968 | A | 10/2008 |
| JP | 2009-196804 | A | 9/2009 |
| JP | 2011-037223 | A | 2/2011 |
| JP | 2011-148167 | A | 8/2011 |
| JP | 2011-150007 | A | 8/2011 |
| JP | 2014-170142 | A | 9/2014 |
| WO | 2005/018944 | A1 | 3/2005 |

OTHER PUBLICATIONS

International Preliminary Report on Patentability and English language Written Opinion of the International Search Report for PCT/JP2021/034289 dated Mar. 28, 2023.

Extended European Search Report for European Patent Application No. 21875288.9 (Jun. 21, 2024).

* cited by examiner

AUXILIARY TAPE CASSETTE PROVIDED WITH CASE HAVING GUIDE SURFACE AROUND WHICH PRINTING TAPE IS WRAPPED TO FORM SPIRAL PORTION

REFERENCE TO RELATED APPLICATIONS

This is a bypass continuation application of International Application No. PCT/JP2021/034289 filed Sep. 17, 2021 claiming priority from Japanese Patent Application No. 2020-164712 filed on Sep. 30, 2020. The entire contents of the International Application and the priority application are incorporated herein by reference.

BACKGROUND ART

In a conventional printing device that prints on printing tape, cassettes accommodating printing tape are attached to and detached from the body of the printing device to supply and interchange printing tape. One such cassette disclosed in Japanese Patent Application Publication No. S63-156762 has an ink ribbon cassette and a printing tape cassette stacked thereon. The ink ribbon cassette accommodates therein an ink ribbon and the printing tape cassette accommodates therein printing tape.

DESCRIPTION

With the cassette described above, printing is performed in a state where printing tape discharged from the printing tape cassette is overlaid on the ink ribbon in the ink ribbon cassette. If a path to the ink ribbon cassette is not properly established for the printing tape at this time, the printing tape may not be properly conveyed due to kinks and the like in the tape.

In view of the foregoing, it is an object of the present disclosure to provide an auxiliary tape cassette and a printing tape cassette that are capable of conveying printing tape properly.

In order to attain the above and other object, according to one aspect, the present disclosure provides an auxiliary tape cassette including a roll and a case. The roll is configured of an auxiliary tape wound about a winding axis. The auxiliary tape is used for printing on a printing tape that is conveyed. The case houses the roll and has a discharge port and a guide surface. The discharge port is for discharging the printing tape from inside the case to outside the case in a discharging direction. The guide surface is for guiding toward the discharge port the printing tape supplied from outside the case. The guide surface is defined on an inner surface or an outer surface of the case. The printing tape is wrapped around the guide surface to form a spiral portion whose angle of rotation about a central axis of the spiral portion is greater than or equal to 180 degrees. The central axis is parallel to the winding axis of the roll. The guide surface includes a curved surface for guiding at least a portion of the spiral portion on an upstream side of the discharge port in the discharging direction of the printing tape.

With this configuration, the guide surface of the auxiliary tape cassette suppresses problems such as kinks in the printing tape being conveyed to a head opening in the auxiliary tape cassette. Therefore, the printing tape can be properly conveyed to the head opening.

According to another aspect, the present disclosure provides a printing tape cassette including a roll and a case. The roll is configured of a printing tape wound about a winding axis. The case houses the roll and has a discharge port and a guide surface. The discharge port is for discharging the printing tape to outside the case. The guide surface is for guiding the printing tape discharged through the discharge port. The printing tape is wrapped around the guide surface to form a spiral portion whose angle of rotation about a central axis of the spiral portion is greater than or equal to 180 degrees. The central axis is parallel to the winding axis of the roll.

With this configuration, the guide surface of the printing tape cassette suppresses problems such as kinks in the printing tape being conveyed to an external printing unit. Therefore, the printing tape can be properly conveyed to the head opening in the auxiliary tape cassette, for example.

According to still another aspect, the present disclosure provides a printing tape cassette including a roll and a case. The roll is configured of a printing tape wound about a winding axis. The case houses the roll and has a coupling surface and a discharge port. The coupling surface crosses the winding axis of the roll. The discharge port is for discharging the printing tape to outside the case in a direction crossing the coupling surface. The discharge port is provided in the coupling surface.

With this configuration, the printing tape is discharged through the discharge port provided in the coupling surface of the case, enabling the printing tape to be properly conveyed to the head opening in the auxiliary tape cassette, for example.

1. FIRST EMBODIMENT

1-1. Configuration

Figure 1:
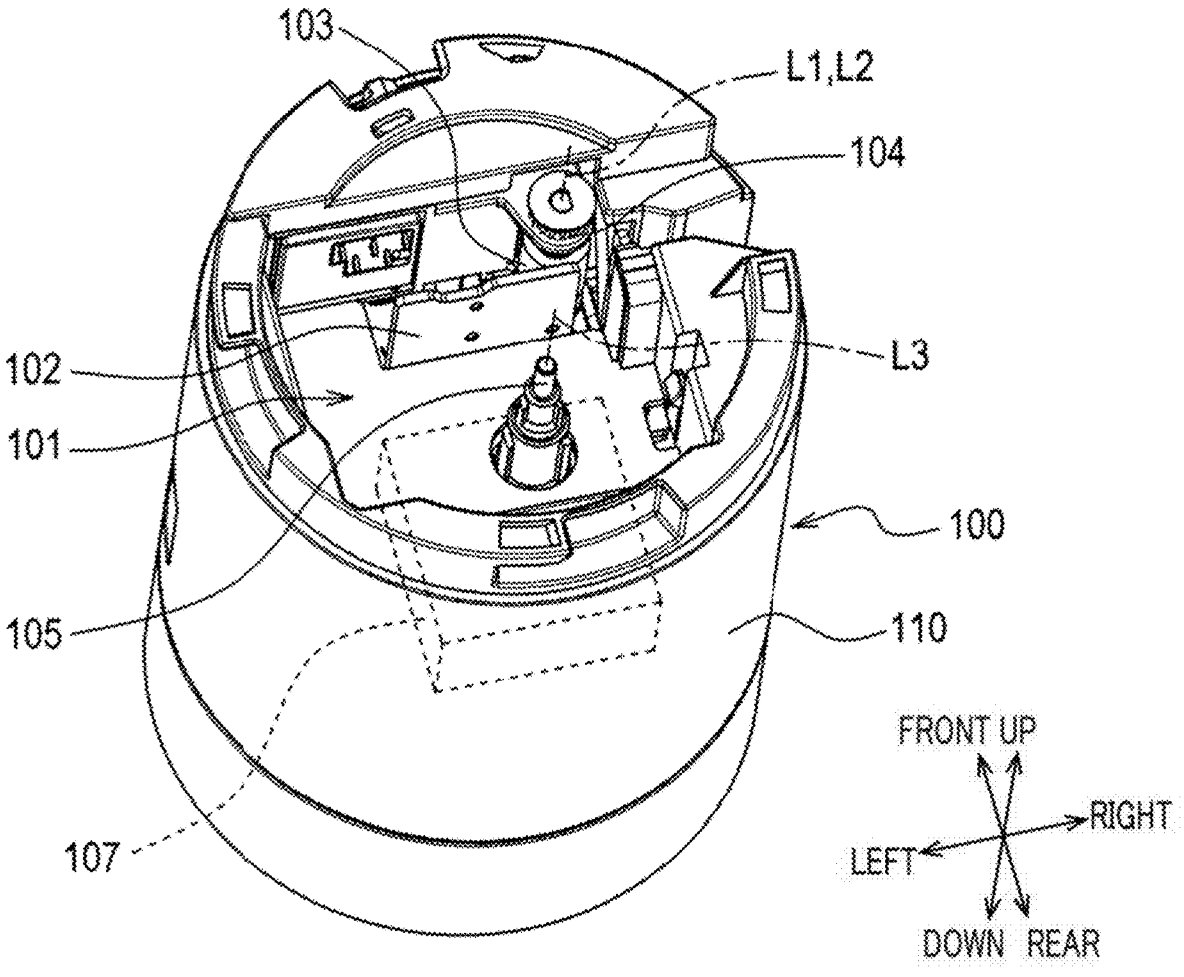
FIG. 1 is a schematic perspective view of a printing device body.
Figure 2B:
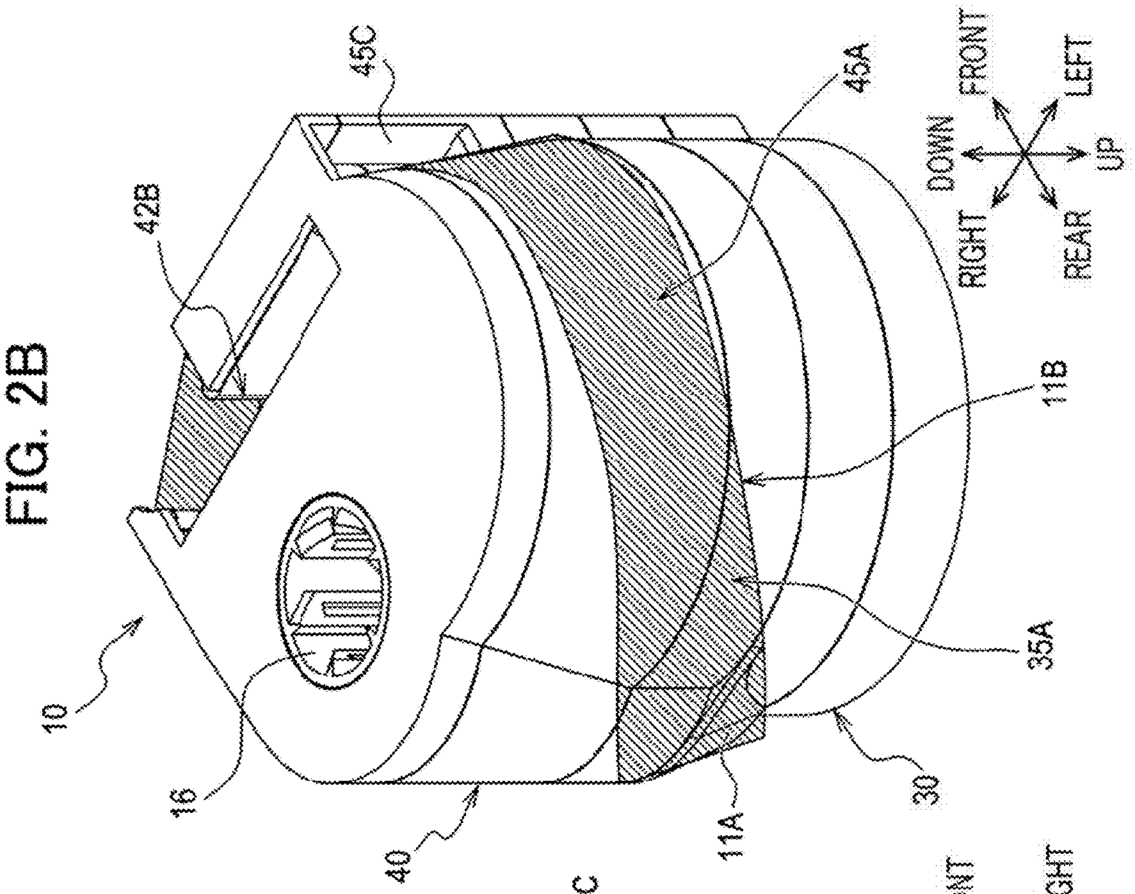
FIGS. 2A and 2B are each a schematic perspective view of a printing cassette.
Figure 2A:
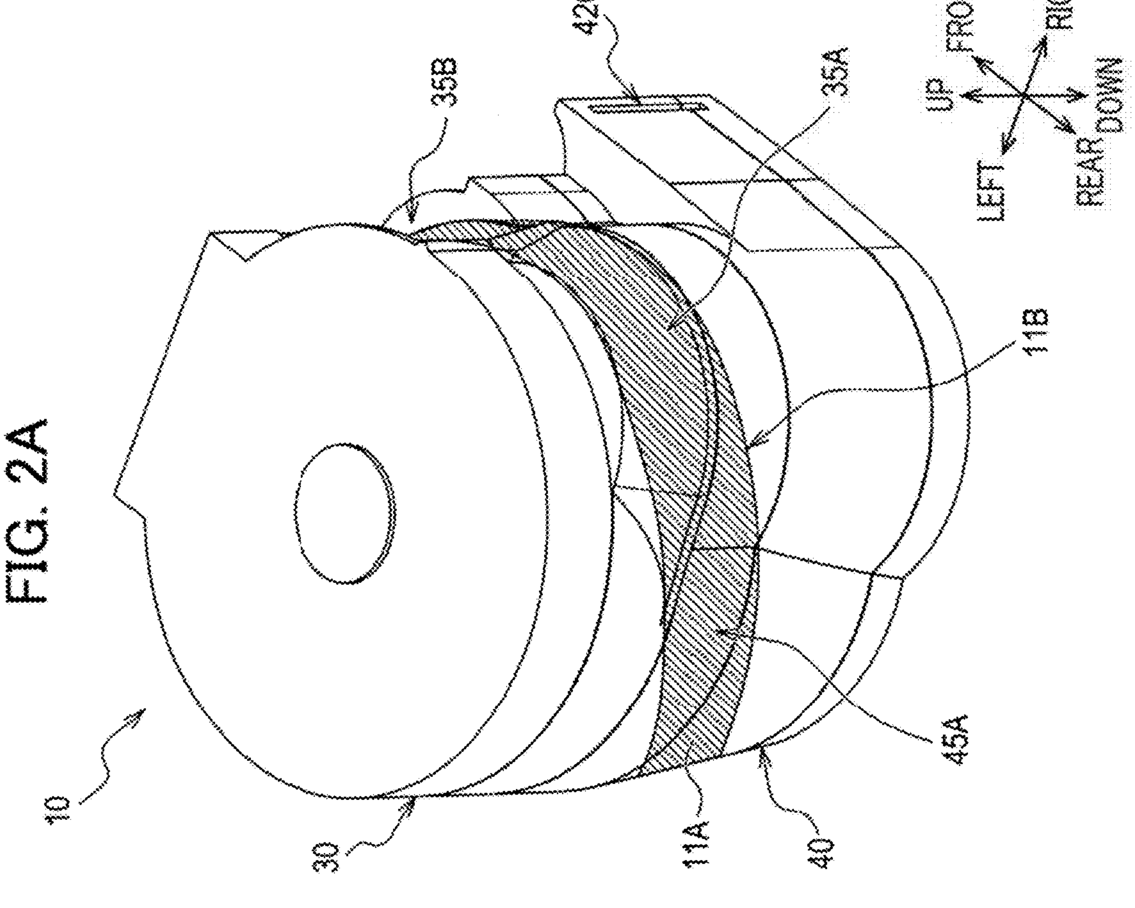

A printing device is configured of a printing device body 100 shown in FIG. 1 together with a printing cassette 10 shown in FIGS. 2A and 2B. This printing device is a device that prints on tape-like printing medium.

In the present embodiment, the axial direction of an output gear 21 will be called the up-down direction, a direction perpendicular to the up-down direction in which the output gear 21 and a take-up spool 16 are aligned will be called the front-rear direction, and a direction perpendicular to both the up-down direction and the front-rear direction will be called the left-right direction.

Printing Device Body

As shown in FIG. 1, the printing device body 100 is provided with a cassette accommodation part 101, a print head 102, a platen roller 103, a platen gear 104, a drive shaft 105, a drive source 107, and a housing 110.

Cassette Housing Part

The cassette accommodation part 101 is a recess to which the printing cassette 10 is attached. The cassette accommodation part 101 is provided in the housing 110. The cassette accommodation part 101 functions to position the printing cassette 10.

Print Head

The print head 102 is disposed inside the cassette accommodation part 101. The print head 102 has a plurality of heating elements whose heating is individually controlled.

Platen Roller

The platen roller 103 is disposed inside the cassette accommodation part 101 near the print head 102 so as to face the print head 102. The platen roller 103 can pivot in a direction toward the print head 102 and in a direction away from the print head 102. The platen roller 103 has a rotational axis L1 that is parallel to the up-down direction.

Platen Gear

The platen gear 104 is coupled to the platen roller 103. The platen gear 104 has a rotational axis L2. In the present embodiment, the rotational axis L2 of the platen gear 104 and the rotational axis L1 of the platen roller 103 are disposed on the same straight line. In other words, the rotational axis L2 is colinear with the rotational axis L1. The platen gear 104 can pivot together with the platen roller 103.

Drive Shaft

The drive shaft 105 is configured to be inserted into both the take-up spool 16 and an input gear 22 in the printing cassette 10. The drive shaft 105 is configured to rotate the take-up spool 16 and input gear 22.

The drive shaft 105 is disposed inside the cassette accommodation part 101. The drive shaft 105 has a rotational axis L3 that is parallel to the up-down direction. The drive shaft 105 is configured to rotate about the rotational axis L3 by the drive source 107.

Drive Source

The drive source 107 is configured to drive the drive shaft 105 to rotate. A mechanism including a motor and gears, for example, can be used as the drive source 107.

Printing Cassette

The printing cassette 10 shown in FIGS. 2A and 2B is provided with a printing medium (i.e., a printing tape 11A). The printing cassette 10 is attachable to and detachable from the printing device body 100. The printing cassette 10 can be interchanged to replenish the printing medium and to change the type of printing media (e.g., the size, color, material, etc.).

The printing cassette 10 includes a printing tape cassette 30, and an auxiliary tape cassette 40. The printing cassette 10 is configured to be attached to the printing device body 100 in a state where the printing tape cassette 30 and auxiliary tape cassette 40 are coupled to each other.

Printing Tape Cassette

Figure 3A:
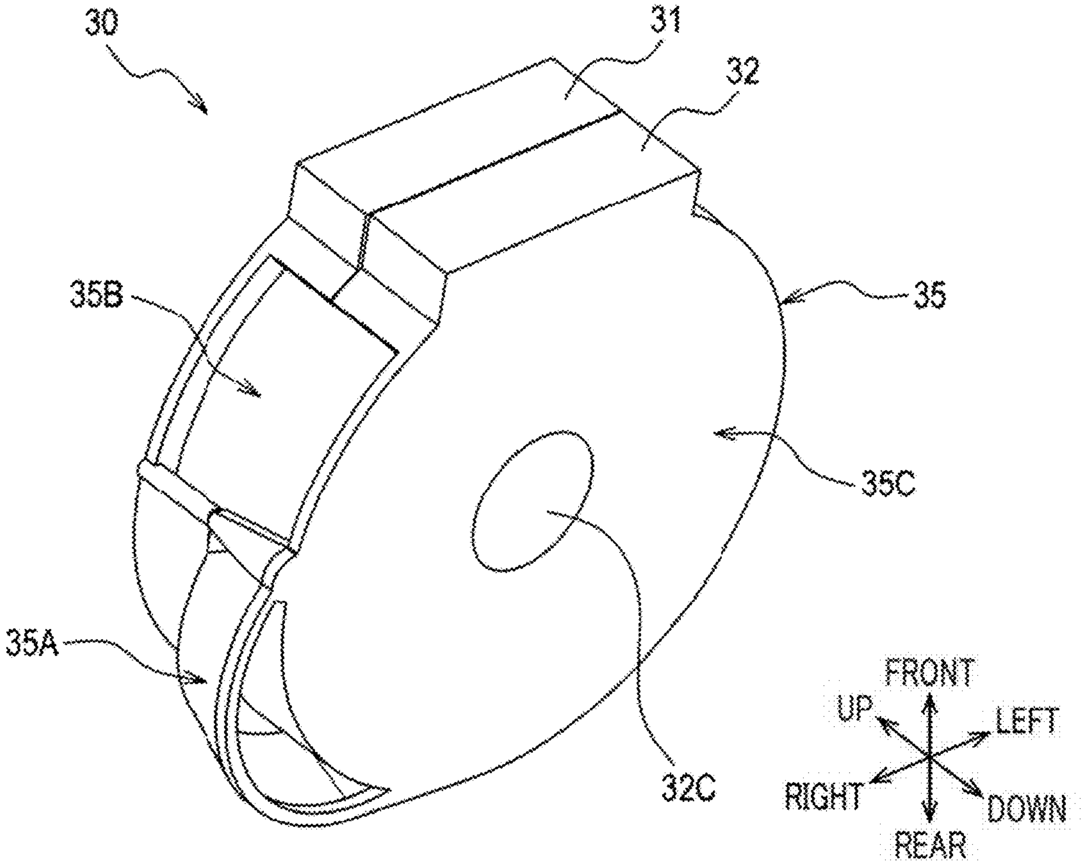
FIGS. 3A and 3B are each a schematic perspective view of a printing tape cassette illustrated in FIG. 2A.
Figure 3B:
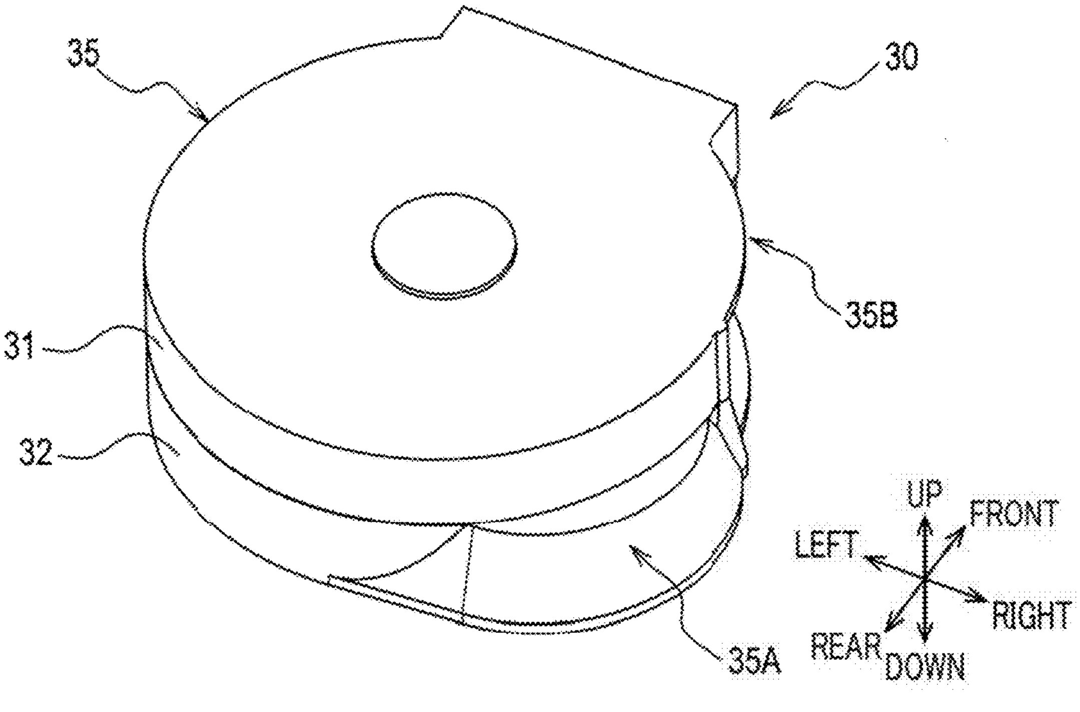
Figure 4:
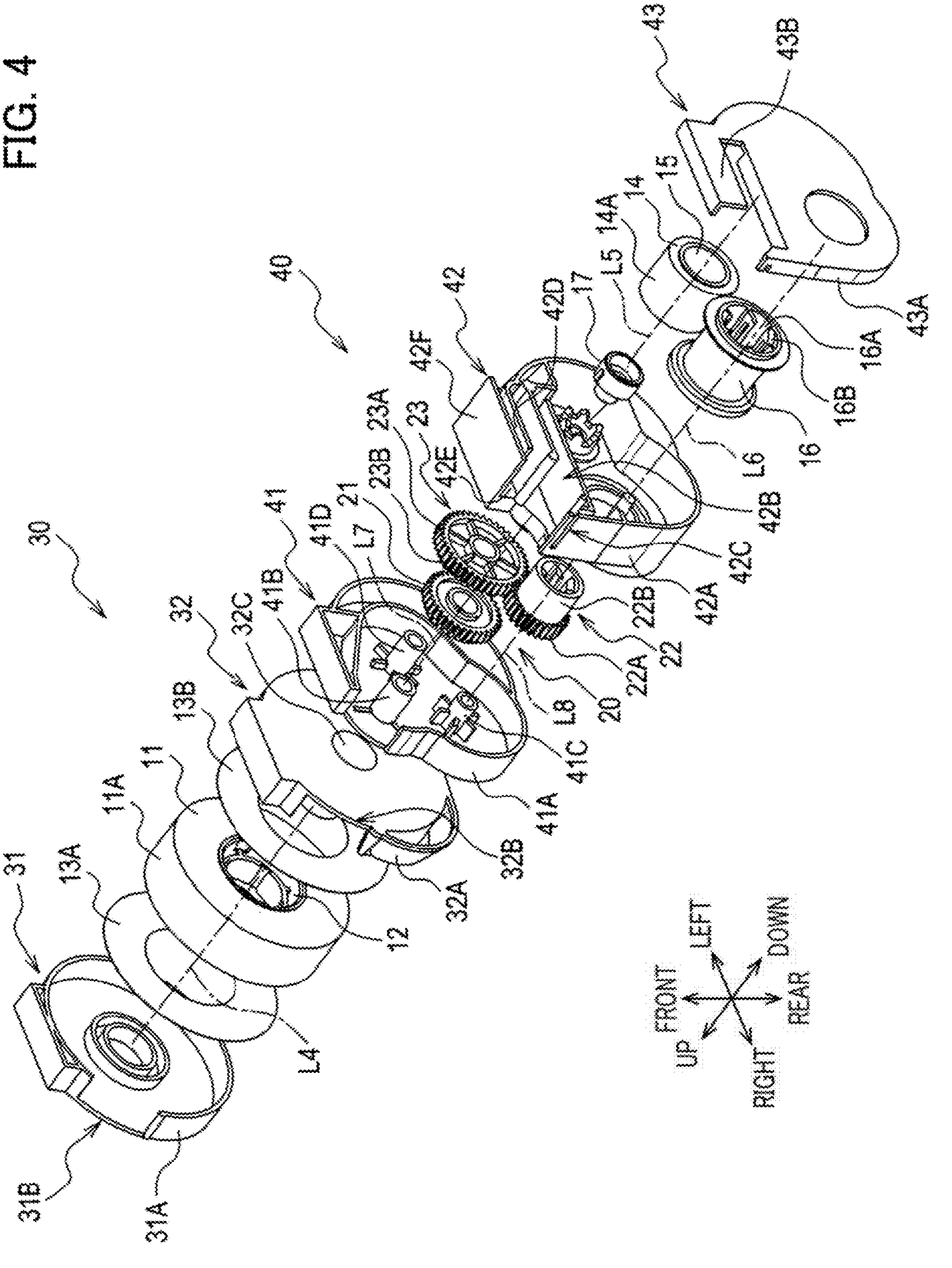
FIG. 4 is a schematic exploded perspective view of the printing cassette illustrated in FIG. 2A.

The printing tape cassette 30 shown in FIGS. 3A and 3B includes a printing tape case 35 that houses at least a portion of the printing tape 11A. As shown in FIG. 4, the printing tape cassette 30 also includes a first roll 11, a first supply spool 12, and spacer films 13A and 13B.

First Roll

The first roll 11 is configured of the printing tape 11A wound around the first supply spool 12. Printing is performed on the printing tape 11A. The front surface of the printing tape 11A is printed by the print head 102 in the printing device body 100 and an ink ribbon 14A (an example of an auxiliary tape).

The two spacer films 13A and 13B are disposed on respective outer sides of the first roll 11 in the up-down direction so as to sandwich the first roll 11. The spacer films 13A and 13B are respectively disposed between the first roll 11 and a first case part 31 and between the first roll 11 and a second case part 32.

First Supply Spool

The first supply spool 12 is rotatable about a rotational axis L4. The first supply spool 12 supplies the printing tape 11A to the print head 102 by rotating as the platen roller 103 of the printing device body 100 conveys the printing tape 11A. The rotational axis L4 of the first supply spool 12 is parallel to the up-down direction. The rotational axis L4 of the first supply spool 12 and the winding axis of the first roll 11 are the same axis.

Printing Tape Cassette

The printing tape case 35 includes the first case part 31 and the second case part 32. Also, the printing tape case 35 has a first guide surface 35A (see FIGS. 3A and 3B) and a first discharge port 35B (see FIGS. 3A and 3B).

The first case part 31 constitutes the upper end portion of the printing tape case 35. The second case part 32 constitutes the lower end portion of the printing tape case 35. The second case part 32 is disposed below the first case part 31 and is coupled to the first case part 31 in the up-down direction. The first roll 11 is disposed in a space enclosed by the first case part 31 and second case part 32.

The first case part 31 has a first side wall 31A, and a first notch 31B. The second case part 32 has a second side wall 32A, a second notch 32B, and a first positioning part 32C.

The first side wall 31A and second side wall 32A constitutes a side surface, among the outer surfaces of the printing tape case 35, that circumferentially surrounds the first roll 11. The first notch 31B is provided in the front portion (and specifically, the right-front portion) of the first side wall 31A. The second notch 32B is provided in the front portion (and specifically, the right-front portion) of the second side wall 32A. The first notch 31B and second notch 32B are coupled together to constitute the first discharge port 35B for the printing tape 11A.

As shown in FIGS. 2A and 2B, part of the side surface of the printing tape case 35 constitutes the first guide surface 35A. The first guide surface 35A is configured to guide the printing tape 11A discharged through the first discharge port 35B of the printing tape case 35.

The first discharge port 35B is provided in the side surface of the printing tape case 35 for discharging the printing tape 11A to an outside of the printing tape case 35. The printing tape 11A is discharged through the first discharge port 35B in a radial direction of the first roll 11. The discharged printing tape 11A is conveyed downward from the first discharge port 35B (i.e., toward the auxiliary tape cassette 40) while being wrapped around the first guide surface 35A in a spiral shape having a central axis that is parallel to the up-down direction.

As shown in FIG. 3A, the first positioning part 32C is a hole formed in a first coupling surface 35C of the printing tape case 35. The first coupling surface 35C faces and contacts the auxiliary tape cassette 40 positioned below the first coupling surface 35C in a state where the printing tape case 35 is inserted into the cassette accommodation part 101. The first positioning part 32C positions the printing tape case 35 relative to the auxiliary tape cassette 40. A second positioning part 41E on the auxiliary tape cassette 40 is inserted into the first positioning part 32C.

The first coupling surface 35C is a flat surface, among the outer surfaces of the printing tape case 35, that crosses (and specifically is orthogonal to) the up-down direction. The auxiliary tape cassette 40 can be arranged on the first coupling surface 35C.

Auxiliary Tape Cassette

Figure 5A:
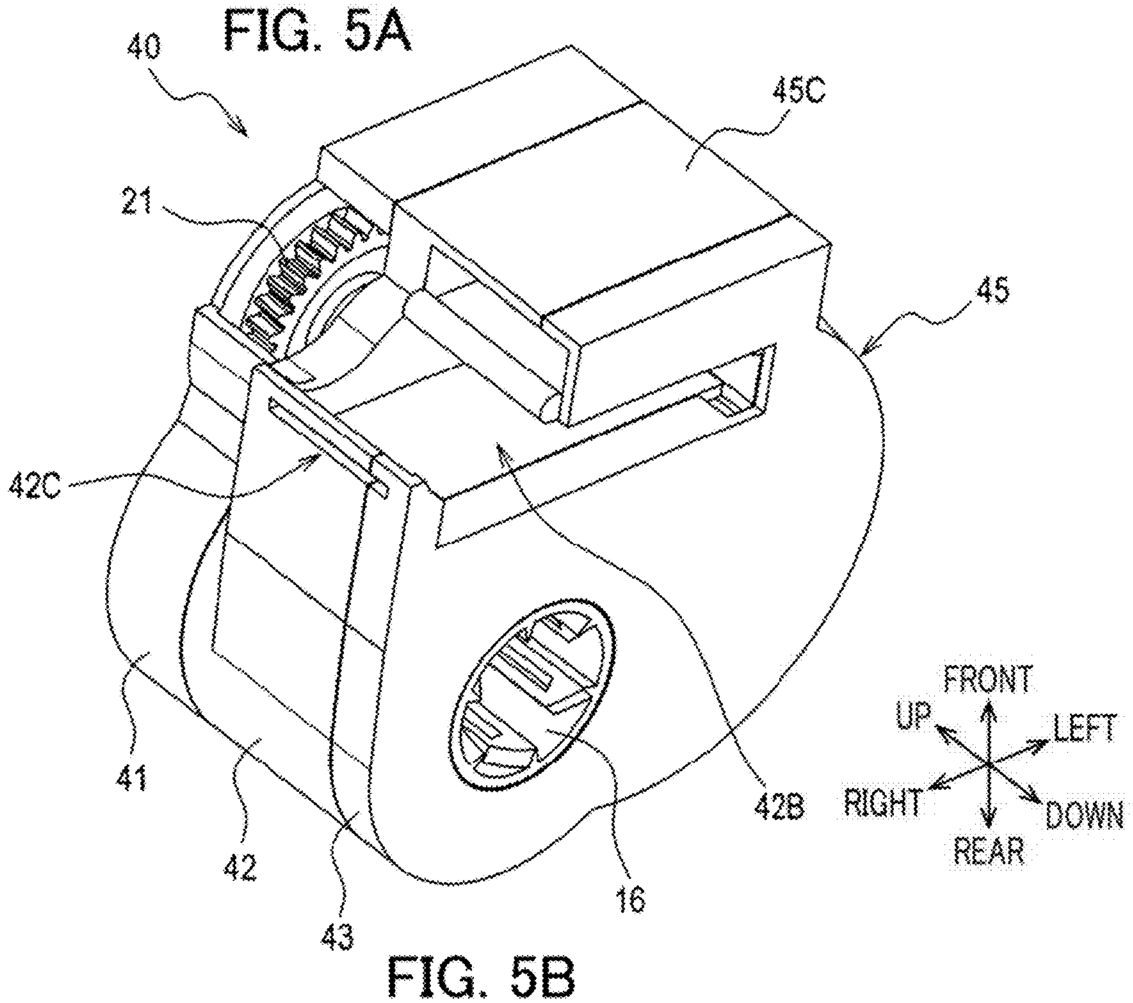
FIGS. 5A and 5B are each a schematic perspective view of an auxiliary tape cassette illustrated in FIG. 2A.
Figure 5B:
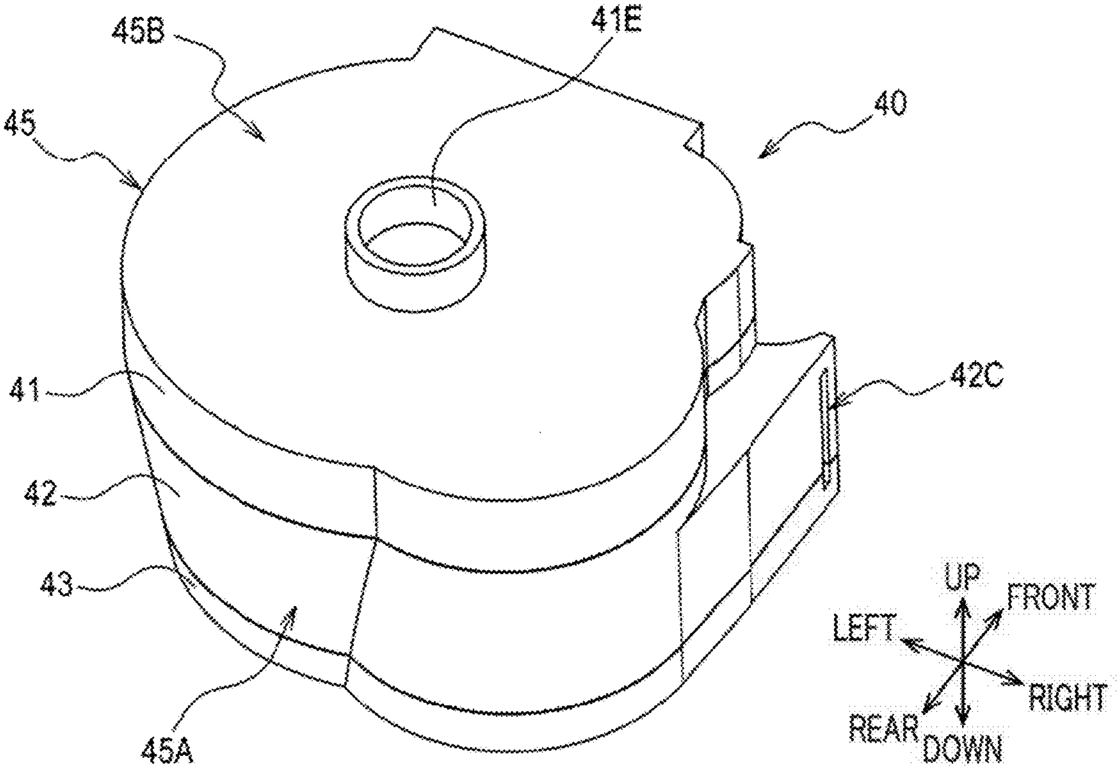

The auxiliary tape cassette 40 shown in FIGS. 5A and 5B is attachable to and detachable from the printing tape cassette 30. The auxiliary tape cassette 40 includes an auxiliary tape case 45 that houses at least part of the ink ribbon 14A and at least part of a drive transmission unit 20.

The auxiliary tape cassette 40 in the present embodiment is also a gear cassette that houses gears. As shown in FIG. 4, the auxiliary tape cassette 40 includes a second roll 14, a second supply spool 15, the take-up spool 16, a clutch spring holder 17, and the drive transmission unit 20.

Second Roll

The second roll 14 is configured of the ink ribbon 14A wound around the second supply spool 15. The ink ribbon 14A is used for printing the printing tape 11A.

The ink ribbon 14A is overlaid on the printing tape 11A being conveyed in a head opening 42B and is used for printing by the print head 102. The ink ribbon 14A that has been used to perform printing is taken up on the take-up spool 16.

Rotational resistance is applied to the second roll 14 by a clutch spring (not shown) held in the clutch spring holder 17. At least a portion of the second roll 14 is disposed in a position overlapping the first roll 11 in the up-down direction. In other words, at least a portion of the second roll 14 is overlapped with the first roll 11 as viewed in the up-down direction.

Second Supply Spool

The second supply spool 15 is rotatable about a rotational axis L5. The rotational axis L5 of the second supply spool 15 is parallel to the rotational axis L4 of the first supply spool 12, i.e., parallel to the up-down direction. The rotational axis L5 of the second supply spool 15 and the winding axis of the second roll 14 are the same axis. The second supply spool 15 supplies the ink ribbon 14A to the head opening 42B by rotating as the take-up spool 16 takes up the ink ribbon 14A.

Take-Up Spool

The take-up spool 16 is rotatable around a rotational axis L6. The rotational axis L6 of the take-up spool 16 is parallel to the rotational axis L5 of the second supply spool 15.

The take-up spool 16 is cylindrical and has a hollow area defined by an inner circumferential surface 16A. Splines 16B are provided on the inner circumferential surface 16A of the take-up spool 16. The drive shaft 105 of the printing device body 100 is configured to be coupled to the splines 16B. When rotated by the drive shaft 105, the take-up spool 16 takes up the ink ribbon 14A that has been used to perform printing.

Drive Transmission Unit

In a state where the printing cassette 10 is attached to the printing device body 100, the transmission mechanism 20 transmits the drive force of the drive source 107 received from the drive shaft 105 to the platen roller 103 and rotates the platen roller 103 at a rotational speed individually set for that printing cassette 10.

The drive transmission unit 20 has the output gear 21, the input gear 22, and an idle gear 23. The drive transmission unit 20 is disposed above the second roll 14 (i.e., near the printing tape cassette 30). In other words, the output gear 21 and input gear 22 are disposed in the auxiliary tape case 45 so as to be separated from the second roll 14 in the up-down direction.

Output Gear

The output gear 21 is an external gear provided for externally outputting a drive force used for conveying the printing tape 11A. Specifically, the output gear 21 outputs the drive force to the platen gear 104 of the printing device body 100. The output gear 21 has a rotational axis L7 that is parallel to the rotational axis L5 of the second supply spool 15. A portion of the output gear 21 is exposed in a space that is in communication with the head opening 42B.

The output gear 21 engages with the platen gear 104 in the space communicating with the head opening 42B in a state where the printing cassette 10 is attached to the printing device body 100 (i.e., in a state where the auxiliary tape case 45 is accommodated in the cassette accommodation part 101).

Input Gear

The input gear 22 is indirectly engaged with the output gear 21 via the idle gear 23 and transmits a drive force to the output gear 21.

The input gear 22 has an external gear 22A, and a spool 22B. The spool 22B is a cylindrical internal gear having an inner circumferential surface provided with splines. The spool 22B is fixed to one side surface of the external gear 22A. The external gear 22A is rotated together with the spool 22B by the drive force of the drive source 107 inputted into the spool 22B.

The input gear 22 has a rotational axis L8 (i.e., the rotational axes of the external gear 22A and spool 22B). The rotational axis L8 of the input gear 22 and the rotational axis L6 of the take-up spool 16 are disposed on the same straight line. In other words, the rotational axis L8 is colinear with the rotational axis L6. At least a portion of the input gear 22 is disposed in a position overlapping the first roll 11 in the up-down direction. In other words, at least a portion of the input gear 22 is overlapped with the first roll 11 as viewed in the up-down direction.

The rotational axis L8 of the input gear 22 overlaps the hollow area of the take-up spool 16 in the up-down direction. In other words, the rotational axis L8 and the hollow area of the take-up spool 16 are overlapped with each other as viewed in the up-down direction. Further, the lower end portion of the spool 22B in the input gear 22 is inserted into the hollow area of the take-up spool 16 from above.

Therefore, the drive shaft 105 is simultaneously inserted into the take-up spool 16 and the input gear 22 in a state where the printing cassette 10 is attached to the printing device body 100. As a result, the input gear 22, although not directly coupled to the take-up spool 16, is rotated together with the take-up spool 16 by the drive shaft 105.

Idle Gear

The idle gear 23 is drivingly coupled to (i.e., engaged with) both the input gear 22 and the output gear 21 for transmitting the drive force inputted into the input gear 22 to the output gear 21. Hence, the drive shaft 105 is configured to input a drive force indirectly to the output gear 21 via the input gear 22 and idle gear 23.

The idle gear 23 is a stepped gear having an upstream gear 23A engaged with the input gear 22, and a downstream gear 23B engaged with the output gear 21. The upstream gear 23A and downstream gear 23B are coaxially juxtaposed. The downstream gear 23B has a smaller diameter than the diameter of the upstream gear 23A. Further, the downstream gear 23B is disposed closer to the printing tape cassette 30 in the up-down direction than the upstream gear 23A to the printing tape cassette 30 in the up-down direction (i.e., above the upstream gear 23A).

The idle gear 23 transmits the drive force inputted into the input gear 22 to the output gear 21 after reducing the rotational speed of the drive force. That is, the drive transmission unit 20 includes a reduction mechanism whose reduction ratio is the transmission ratio obtained by dividing the rotational speed of the input gear 22 by the rotational speed of the output gear 21.

Auxiliary Tape Case

The auxiliary tape case 45 has a third case part 41, a fourth case part 42, a fifth case part 43, and a second guide surface 45A (see FIGS. 2A and 2B).

The third case part 41 constitutes the upper end portion of the auxiliary tape case 45. The fifth case part 43 constitutes the lower end portion of the auxiliary tape case 45. The fourth case part 42 is arranged below the third case part 41 and above the fifth case part 43 and is coupled to both the third case part 41 and the fifth case part 43 in the up-down direction.

The second roll 14, second supply spool 15, and take-up spool 16 are disposed in a space enclosed by the fourth case part 42 and fifth case part 43. The idle gear 23, the input gear 22, and a portion of the output gear 21 are disposed in a space enclosed by the third case part 41 and fourth case part 42.

The third case part 41 has a third side wall 41A, a first gear support part 41B, a second gear support part 41C, a third gear support part 41D, and the second positioning part 41E (see FIG. 5B). The third side wall 41A constitutes the side surface, among the outer surfaces of the auxiliary tape case 45, that is continuous with the side surface of the printing tape case 35.

The first gear support part 41B rotatably supports the output gear 21. The second gear support part 41C rotatably supports the input gear 22. The third gear support part 41D rotatably supports the idle gear 23.

The second positioning part 41E shown in FIG. 5B is provided on a second coupling surface 45B of the auxiliary tape case 45. The second coupling surface 45B faces and contacts the printing tape cassette 30 positioned above the second coupling surface 45B in a state where the auxiliary tape case 45 is inserted in the cassette accommodation part 101.

The second coupling surface 45B is a flat surface, among the outer surfaces of the auxiliary tape case 45, that crosses (and specifically is orthogonal to) the up-down direction. The second coupling surface 45B is parallel to the first coupling surface 35C of the printing tape case 35. The printing tape cassette 30 can be arranged on the second coupling surface 45B.

The second positioning part 41E is a cylindrical or columnar part that protrudes upward from the second coupling surface 45B. When the auxiliary tape cassette 40 and the printing tape cassette 30 are coupled together, the second positioning part 41E is inserted into the first positioning part 32C of the printing tape case 35, whereby the auxiliary tape cassette 40 is fixed in position relative to the printing tape cassette 30 in the front-rear and left-right directions.

The fourth case part 42 shown in FIG. 4 has a fourth side wall 42A, the head opening 42B, a second discharge port 42C, an inner guide wall 42D, a first restricting part 42E, and a ceiling wall 42F. The fourth side wall 42A constitutes a side surface, among the outer surfaces of the auxiliary tape case 45, that circumferentially surrounds the second roll 14.

The head opening 42B is a notch formed by cutting off a portion of the fourth side wall 42A. The head opening 42B is a space in which the print head 102 is placed in a state where the printing cassette 10 is attached to the printing device body 100.

In the head opening 42B, printing is performed on the printing tape 11A by the print head 102. The head opening 42B is open in the bottom of the auxiliary tape cassette 40 so that the print head 102 can be inserted from below. The printing tape 11A and ink ribbon 14A are bridged over the head opening 42B in the left-right direction.

The printing tape 11A on which printing has been performed is discharged to an outside of the printing cassette 10 through the second discharge port 42C. That is, the second discharge port 42C allows the printing tape 11A to be discharged from the inside of the auxiliary tape case 45 to the outside thereof. The printed printing tape 11A is discharged from the printing device to the outside thereof through the second discharge port 42C.

The inner guide wall 42D is a plate-like part having a front surface that guides the printing tape 11A (i.e., contacts the printing tape 11A from rear) in the left-right direction in the auxiliary tape case 45. The inner guide wall 42D constitutes part of the fourth side wall 42A that guides the printing tape 11A toward the second discharge port 42C.

The inner guide wall 42D is continuously provided from the fourth side wall 42A. Additionally, the inner guide wall 42D is disposed upstream of the head opening 42B in the discharging direction of the printing tape 11A and frontward of the head opening 42B.

At least part of the inner guide wall 42D is disposed at the same position as the second discharge port 42C in the up-down direction. That is, at least part of the inner guide wall 42D overlaps the second discharge port 42C in a direction orthogonal to the up-down direction. In other words, at least part of the inner guide wall 42D and the second discharge port 42C are overlapped with each other as viewed in a direction orthogonal to the up-down direction. The printing tape 11A is conveyed on the inner guide wall 42D in a direction orthogonal to the up-down direction (and specifically, in the left-right direction).

The first restricting part 42E restricts the printing tape 11A, which is being conveyed along the second guide surface 45A which is constituted by the inner guide wall 42D, from moving in the width direction of the printing tape 11A. Specifically, the first restricting part 42E is disposed above the inner guide wall 42D and has a bottom surface that is orthogonal to the up-down direction.

The ceiling wall 42F is disposed frontward of the inner guide wall 42D and is spaced apart from the inner guide wall 42D. The space between the ceiling wall 42F and inner guide wall 42D constitutes a conveying path for the printing tape 11A. The ceiling wall 42F is connected to the first restricting part 42E. The inner surface (i.e., rear surface) of the ceiling wall 42F constitutes a restricting surface that is arranged to face the second guide surface 45A (i.e., the inner guide wall 42D).

The fifth case part 43 has a fifth side wall 43A, and a second restricting part 43B. The fifth side wall 43A constitutes, in cooperation with the fourth side wall 42A of the fourth case part 42, the side surface of the auxiliary tape case 45 that circumferentially surrounds the second roll 14.

The second restricting part 43B restricts the printing tape 11A, which is being conveyed along the second guide surface 45A, from moving in the width direction of the printing tape 11A. Specifically, the second restricting part 43B is disposed below the inner guide wall 42D of the fourth case part 42 and has a top surface that is orthogonal to the up-down direction. The second restricting part 43B faces the first restricting part 42E of the fourth case part 42 in the up-down direction.

The inner guide wall 42D, ceiling wall 42F, first restricting part 42E, and second restricting part 43B constitute an arm part 45C. The arm part 45C has an inner space through which the printing tape 11A passes when being conveyed along the second guide surface 45A of the auxiliary tape case 45, as shown in FIG. 2B. After passing through the arm part 45C, the printing tape 11A is fed into the head opening 42B.

In the arm part 45C, the inner guide wall 42D and ceiling wall 42F restrict movement of the printing tape 11A in the front-rear direction (i.e., the thickness direction) and the first restricting part 42E and second restricting part 43B restrict movement of the printing tape 11A in the up-down direction (i.e., the width direction).

As shown in FIGS. 2A and 2B, part of the side surface of the auxiliary tape case 45 constitutes the second guide surface 45A, which guides the printing tape 11A supplied from outside the auxiliary tape case 45 (i.e., from the printing tape cassette 30) toward the second discharge port 42C. The printing tape 11A guided by the first guide surface 35A of the printing tape case 35 is further guided toward the head opening 42B by the second guide surface 45A.

Conveyance and Printing of Printing Tape with the Printing Device Body

In a state where the printing cassette 10 is attached to the printing device body 100, the printing tape 11A is wrapped around the first guide surface 35A of the printing tape case 35 and the second guide surface 45A of the auxiliary tape case 45 to form a spiral portion 11B whose angle of rotation about a central axis parallel to the up-down direction (i.e., the wound angle of the wrapped printing tape 11A around the printing tape case 35 and auxiliary tape case 45 when viewed along the up-down direction) is 180 degrees or greater.

The spiral portion 11B of the printing tape 11A being conveyed is wrapped across the side surface of the printing tape case 35 and side surface of the auxiliary tape case 45. Specifically, the spiral portion 11B extends from the first discharge port 35B of the printing tape case 35 to the inside of the arm part 45C.

Each of the first guide surface 35A and second guide surface 45A has a curved surface that guides at least a portion of the spiral portion 11B on the upstream side of the head opening 42B in the discharging direction of the printing tape 11A.

Specifically, the first guide surface 35A is configured entirely of a curved surface. The second guide surface 45A is also configured of a curved surface in all areas except the inside of the arm part 45C (i.e., except the front surface of the inner guide wall 42D).

The radius of curvature for at least part of the curved surface of the first guide surface 35A and the radius of curvature for at least part of the curved surface of the second guide surface 45A are each greater than one half the outer diameter of the second roll 14.

In a state where the printing cassette 10 is attached to the printing device body 100 with the printing tape 11A wrapped around the guide surfaces in this way, the print head 102 is disposed in the head opening 42B at a position overlapping the printing tape 11A and ink ribbon 14A in the front-rear direction (i.e., in such a manner that the print head 102 is overlapped with the printing tape 11A and ink ribbon 14A as viewed in the front-rear direction).

The platen roller 103 conveys the printing tape 11A into the head opening 42B and presses the printing tape 11A against the print head 102, whose heating elements have been heated, through the ink ribbon 14A. As a result, some ink provided on the surface of the ink ribbon 14A is transferred onto the printing tape 11A to print characters, symbols, and the like on the printing tape 11A.

The platen roller 103 conveys the printed printing tape 11A in the printing cassette 10 toward the outside of the printing cassette 10. The platen roller 103 is rotated by the platen gear 104, which is engaged with the output gear 21. The platen roller 103 and platen gear 104 can pivot between a position separated from the printing cassette 10 and a position in which the platen gear 104 is engaged with the output gear 21.

In a state where the auxiliary tape case 45 of the printing cassette 10 is inserted into the cassette accommodation part 101, the drive shaft 105 is engaged with the input gear 22 and the platen gear 104 is engaged with the output gear 21.

Specifically, the platen gear 104 comes into engagement with the output gear 21 when the platen roller 103 and platen gear 104 pivot toward the head opening 42B of the printing cassette 10 in a state where the drive shaft 105 is inserted into both the take-up spool 16 and input gear 22 of the printing cassette 10.

In a state where the printing cassette 10 is attached, the output gear 21 is rotated when the drive shaft 105 rotates the input gear 22. Further, the platen gear 104 is rotated by the rotation of the output gear 21, and the platen roller 103 is rotated by the rotation of the platen gear 104.

Variation of the First Embodiment

Figure 6A:
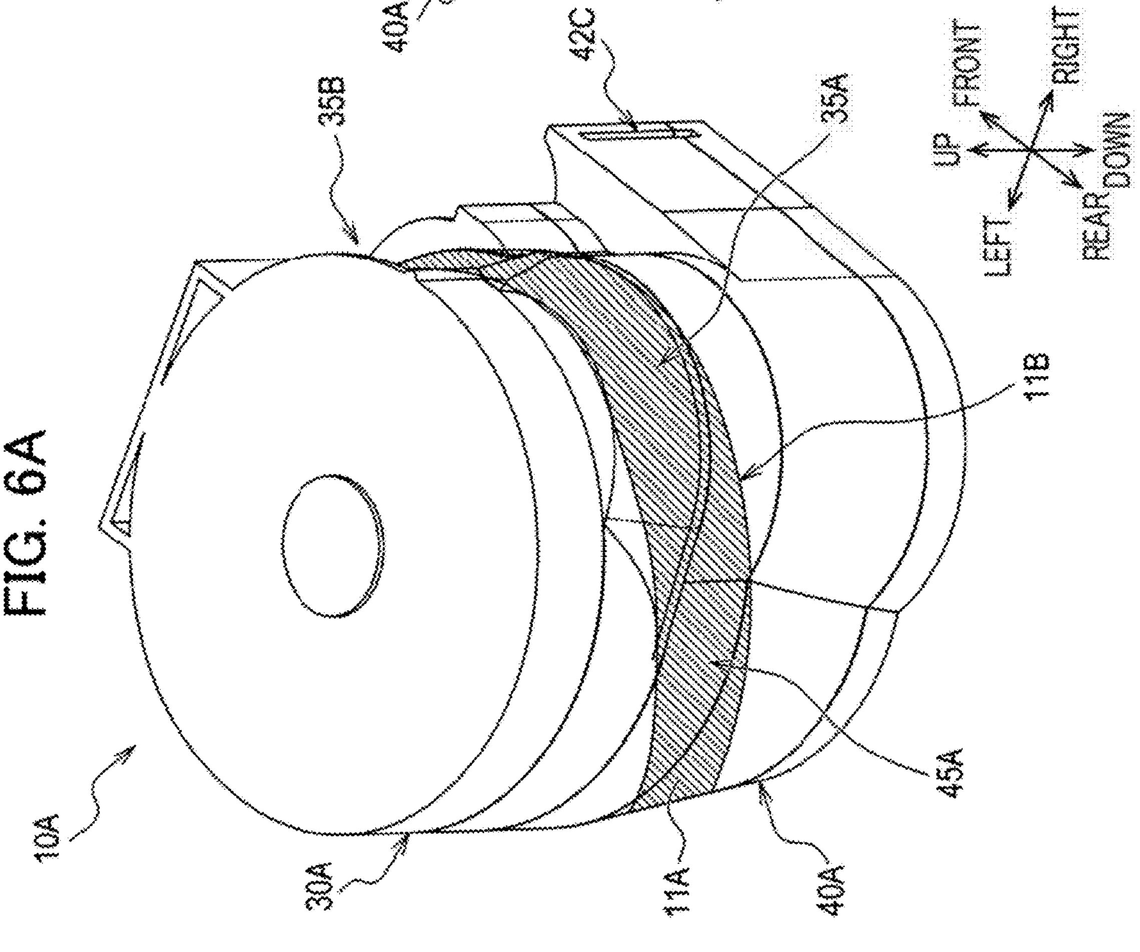
FIGS. 6A and 6B are each a schematic perspective view of a printing cassette.
Figure 6B:
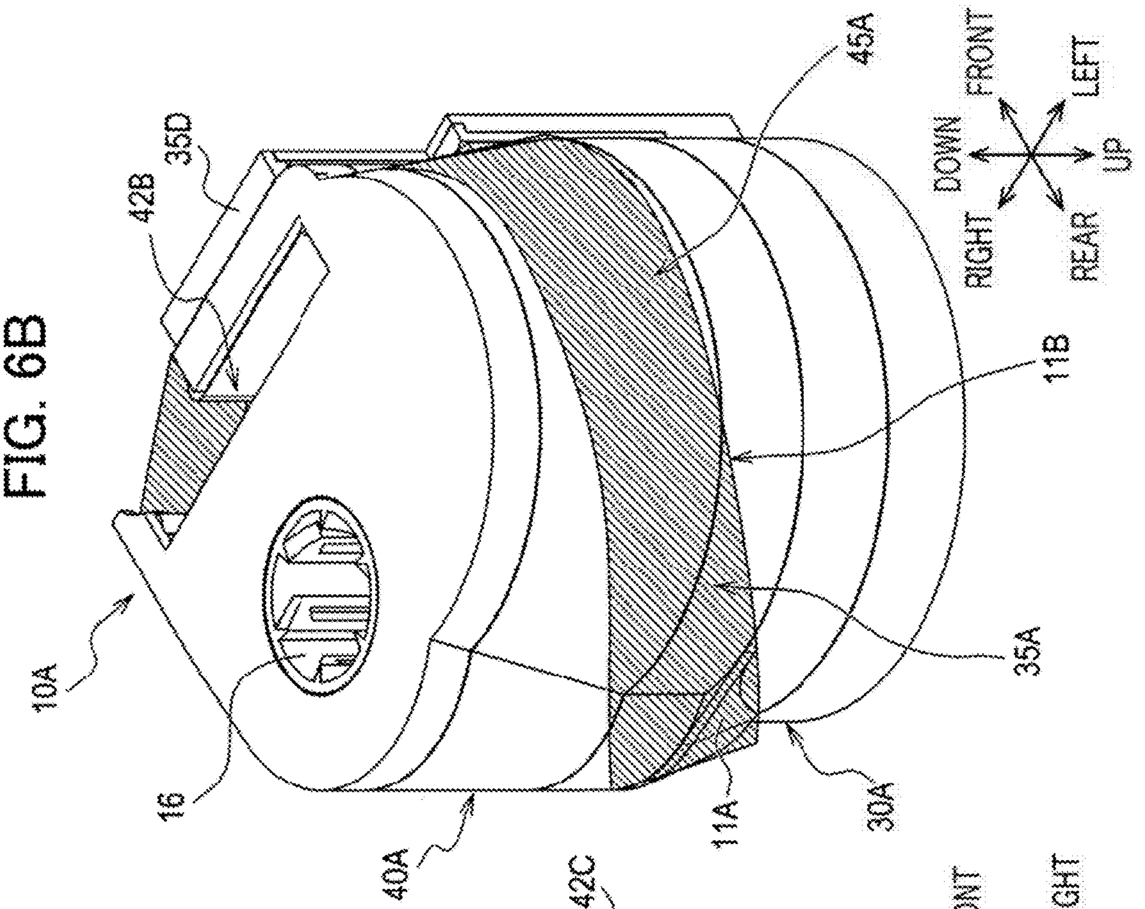

A printing cassette 10A shown in FIGS. 6A and 6B has a printing tape cassette 30A, and an auxiliary tape cassette 40A. The arm part 45C provided on the auxiliary tape cassette 40 in the printing cassette 10 of FIGS. 2A and 2B is provided on the printing tape cassette 30A of the printing cassette 10A as an arm part 35D.

Figure 7B:
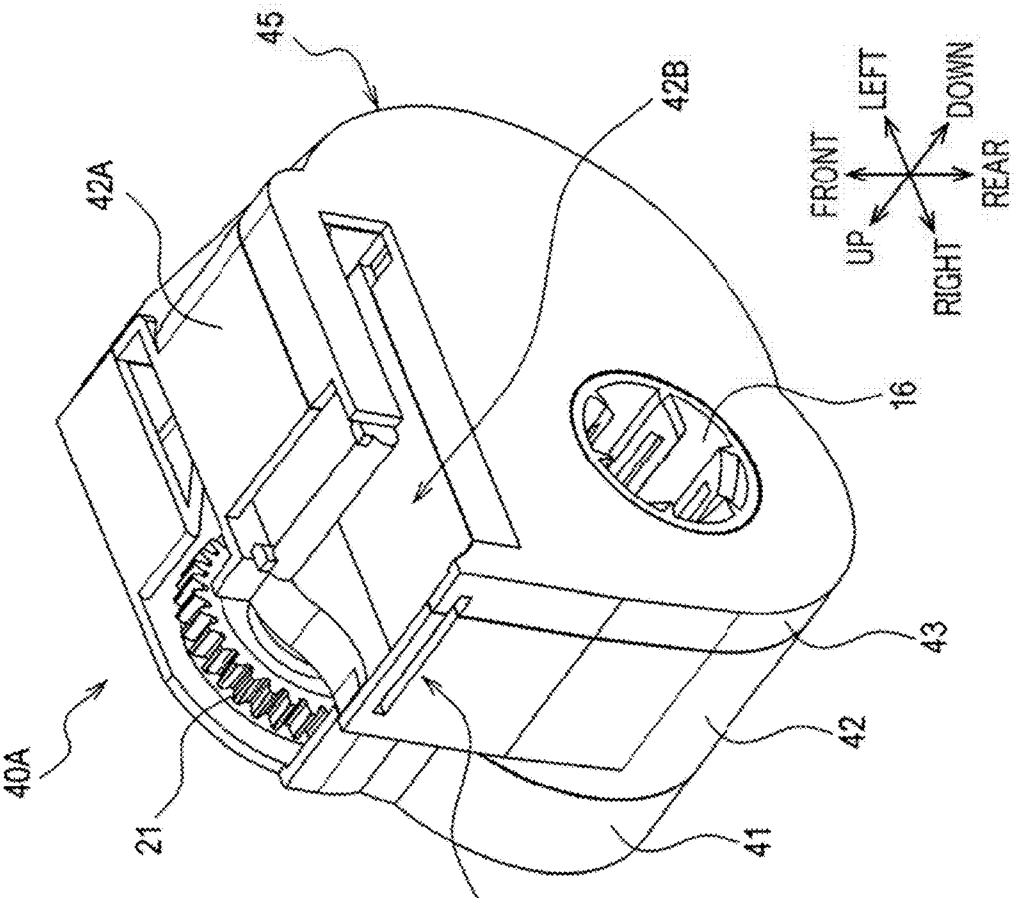
FIG. 7B is a schematic perspective view of an auxiliary tape cassette illustrated in FIG. 6A.
Figure 7A:
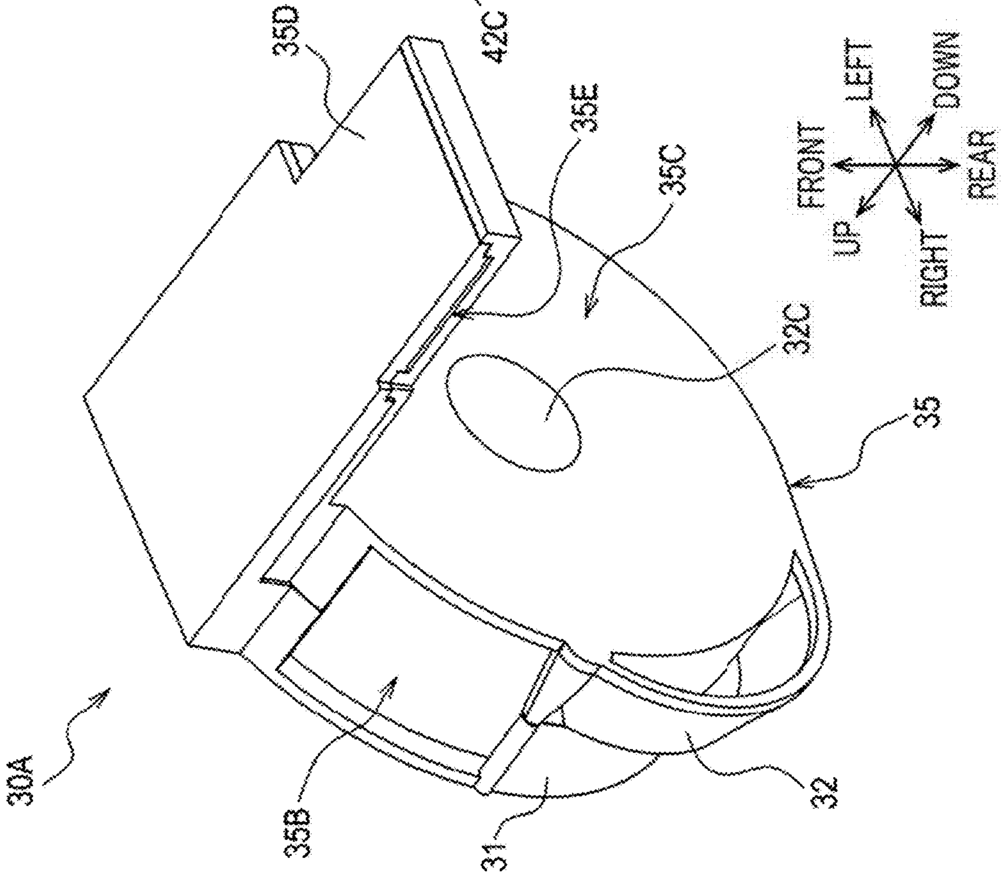
FIG. 7A is a schematic perspective view of a printing tape cassette illustrated in FIG. 6A.

As shown in FIG. 7A, the arm part 35D of the printing tape cassette 30A has a slit-like conveying path 35E that enables the printing tape 11A to pass through the inside of the arm part 35D. The arm part 35D is disposed to the front of the head opening 42B in the auxiliary tape cassette 40A shown in FIG. 7B (and specifically, to the front of the fourth side wall 42A) with the arm part 35D overlaid on the fourth side wall 42A. The arm part 35D is configured of a downwardly protruding plate part of the first case part 31 and a downwardly protruding plate part of the second case part 32.

1-2. Effects

The following effects can be obtained according to the embodiments described above.

(1a) The first guide surface 35A of the printing tape cassette 30 and the second guide surface 45A of the auxiliary tape cassette 40 both suppress kinks and other problems in the printing tape 11A being fed to the head opening 42B. Therefore, the printing tape 11A can be conveyed properly to the head opening 42B provided in the auxiliary tape cassette 40.

(1b) The first positioning part 32C of the printing tape cassette 30 and the second positioning part 41E of the auxiliary tape cassette 40 can suppress misalignment in the positions of the printing tape case 35 and auxiliary tape case 45. As a result, stability in conveyance of the printing tape 11A can be enhanced.

(1c) By arranging the drive transmission unit 20 in the auxiliary tape case 45 so as to be separated from the second roll 14 in the up-down direction, the size of the auxiliary tape case 45 can be reduced in the front-rear and left-right directions while enabling the printing tape 11A to be suitably conveyed to the head opening 42B.

(1d) The first restricting part 42E and second restricting part 43B can enhance stability in the conveyance of printing tape 11A to the head opening 42B.

(1e) The restricting surface of the ceiling wall 42F can enhance stability in the conveyance of printing tape 11A to the head opening 42B.

2. SECOND EMBODIMENT

2-1. Configuration

Figure 8B:
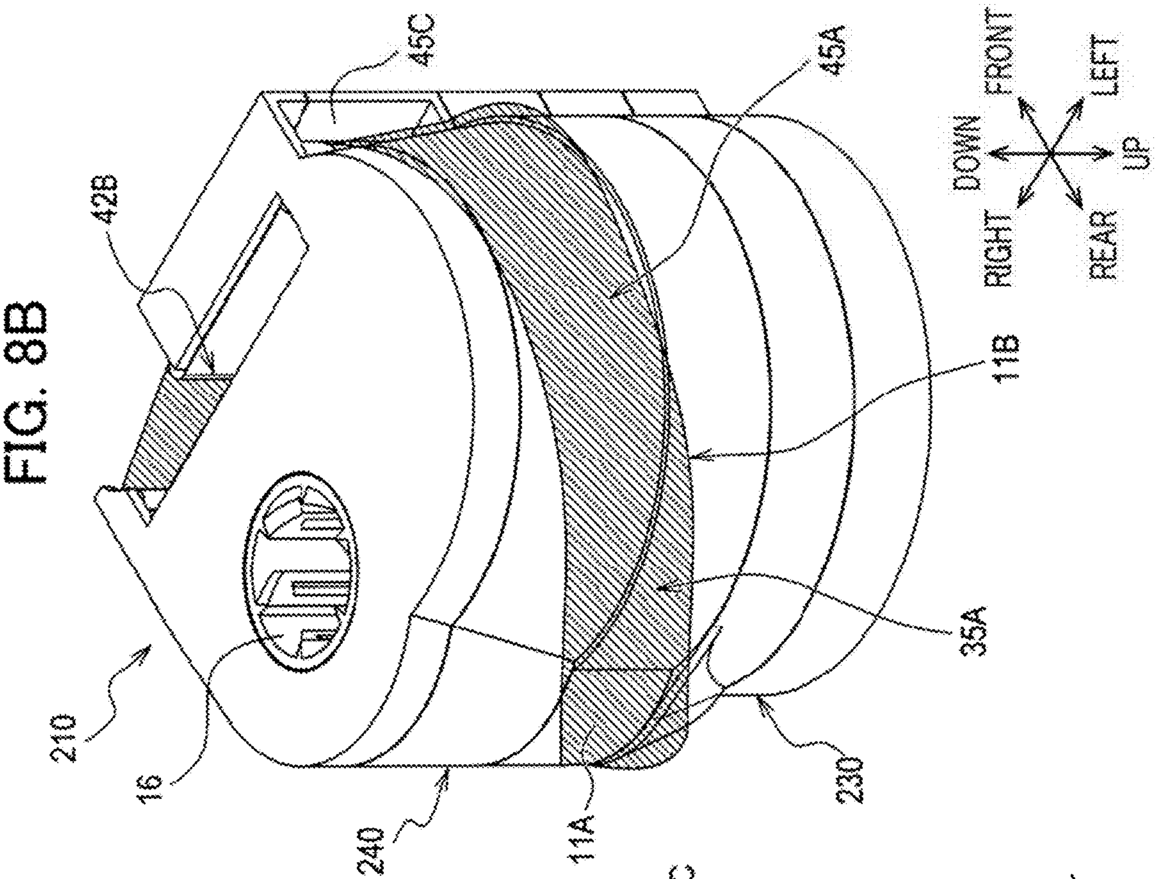
FIGS. 8A and 8B are each a schematic perspective view of a printing cassette.
Figure 8A:
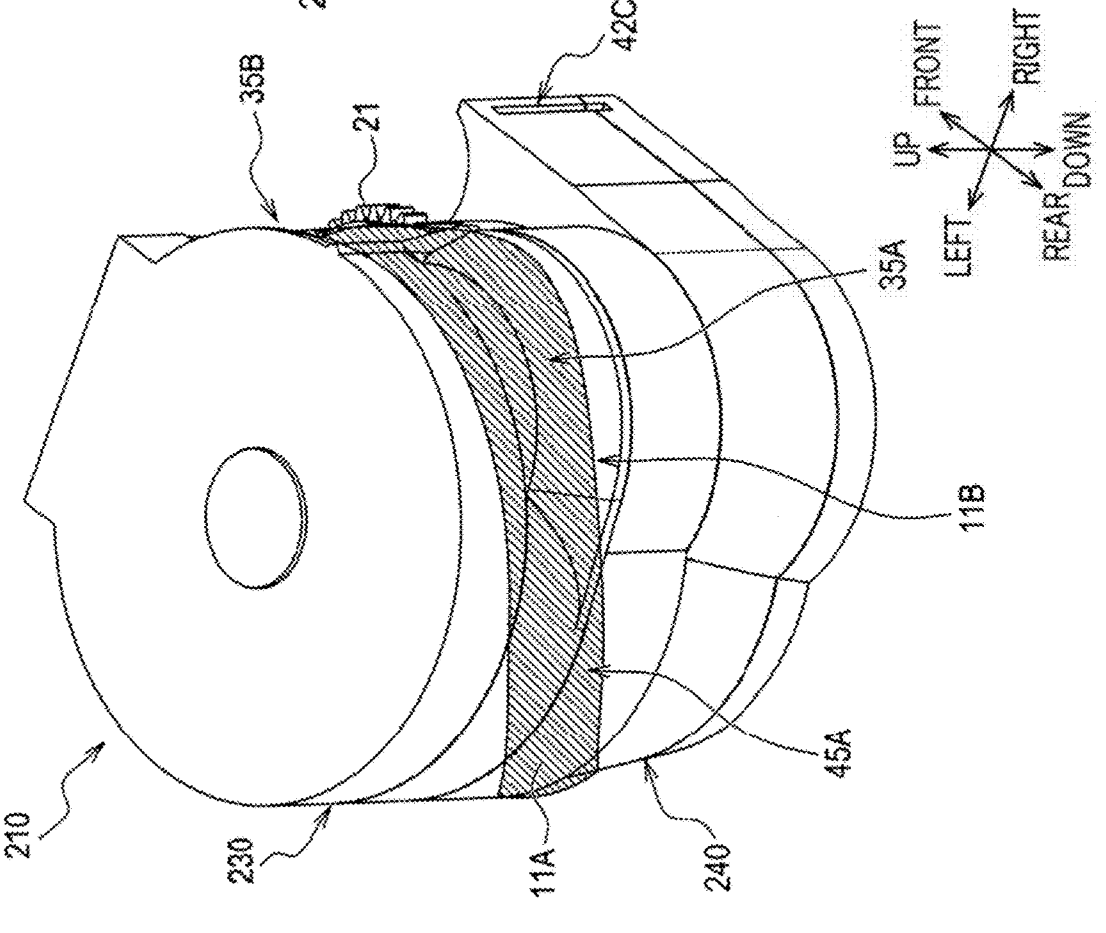

A printing cassette 210 shown in FIGS. 8A and 8B is attached to the printing device body 100 of FIG. 1 in place of the printing cassette 10 according to the first embodiment. The printing cassette 210 includes a printing tape cassette 230, and an auxiliary tape cassette 240.

Printing Tape Cassette

Figure 9A:
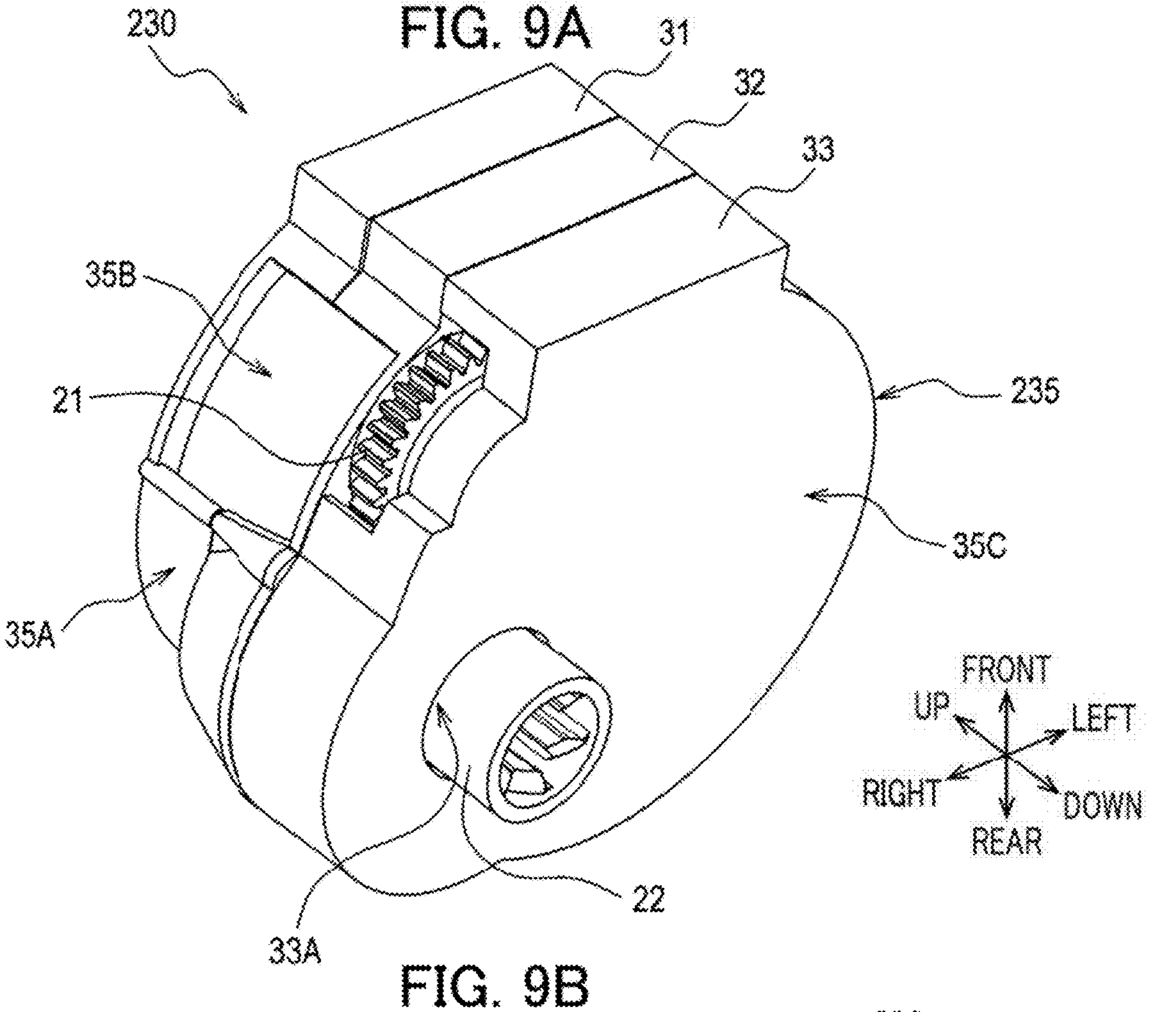
FIGS. 9A and 9B are each a schematic perspective view of a printing tape cassette illustrated in FIG. 8A.
Figure 9B:
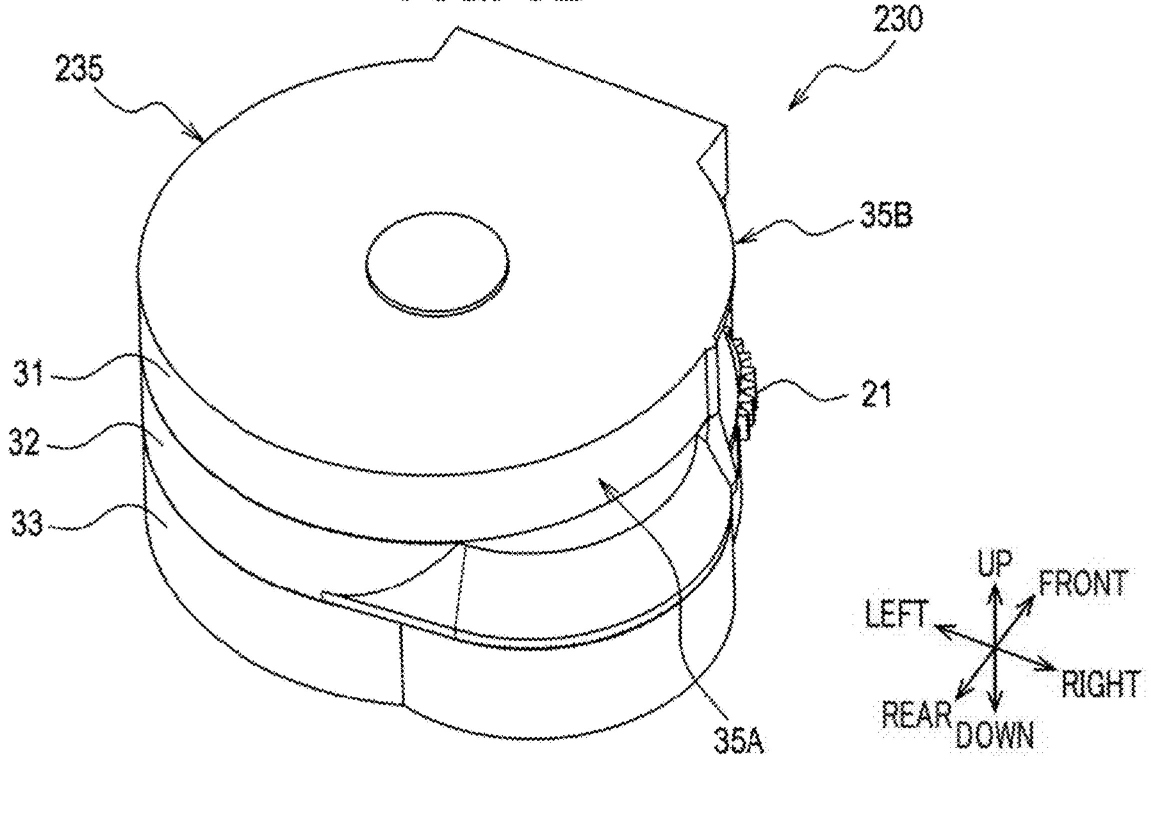

The printing tape cassette 230 shown in FIGS. 9A and 9B includes a printing tape case 235 that houses both the printing tape 11A and the drive transmission unit 20. In the present embodiment, the printing tape cassette 230 is also a gear cassette that houses gears.

The printing tape cassette 230 is configured by adding the third case part 41 of the auxiliary tape cassette 40 in the first embodiment to the printing tape cassette 30 in the first embodiment as a third case part 33 and by arranging the drive transmission unit 20 of the first embodiment inside the printing tape case 235. The remaining configuration of the printing tape cassette 230 is identical to the printing tape cassette 30 in the first embodiment.

The third case part 33 constitutes the bottom portion of the printing tape case 235 and is coupled to the bottom of the second case part 32. Part of the output gear 21, the input gear 22, and the idle gear 23 are disposed in a space enclosed by the second case part 32 and third case part 33.

That is, the first roll 11 is disposed in a space enclosed by the first case part 31 and second case part 32, and the output gear 21 and input gear 22 are arranged in the printing tape case 235 so to be separated from the first roll 11 in the up-down direction.

The lower surface of the third case part 33 constitutes the first coupling surface 35C on which the auxiliary tape cassette 240 can be arranged. The first coupling surface 35C has an insertion hole 33A through which the input gear 22 is inserted in the up-down direction. The printing tape case 235 includes a positioning part for positioning the printing tape case 235 relative to the auxiliary tape cassette 240. The positioning part is configured of the input gear 22 protruding from the first coupling surface 35C.

Auxiliary Tape Cassette

Figure 10A:
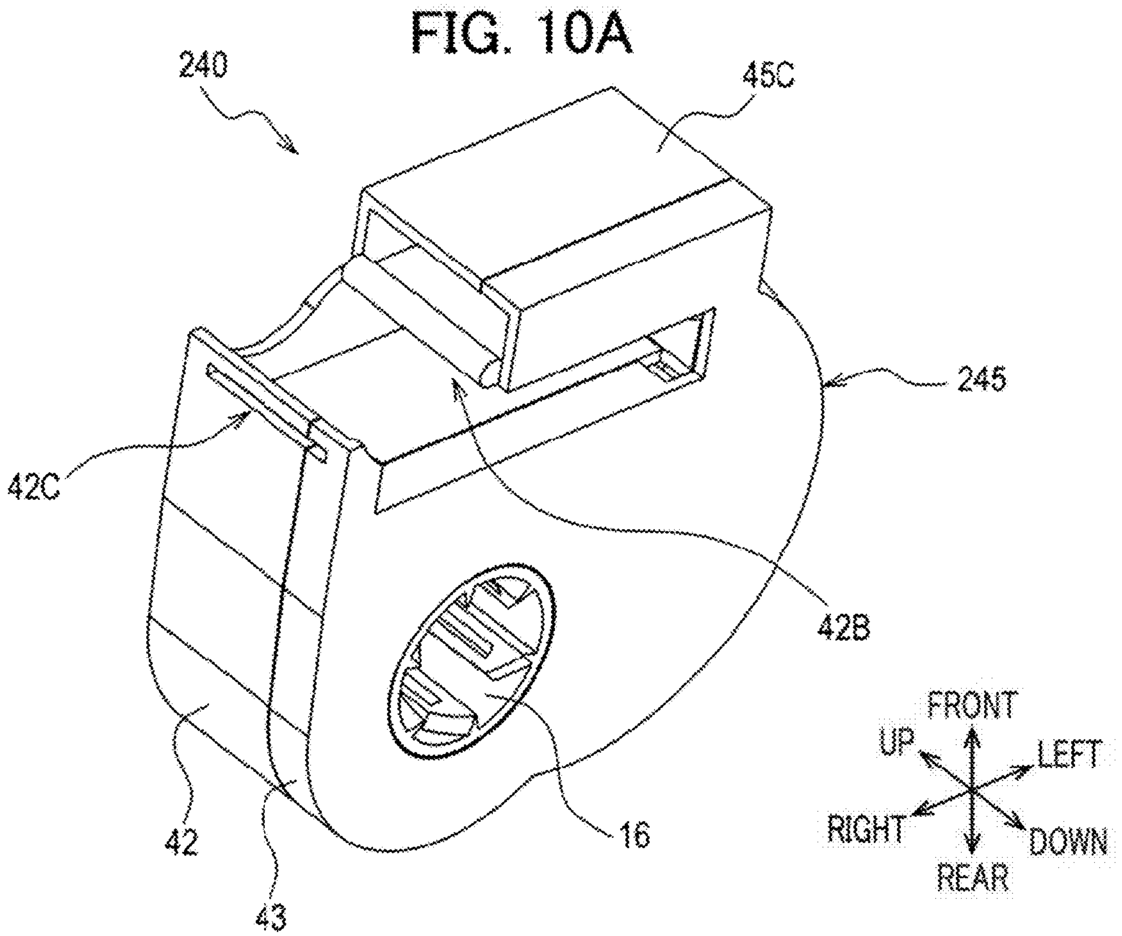
FIGS. 10A and 10B are each a schematic perspective view of an auxiliary tape cassette illustrated in FIG. 8A.
Figure 10B:
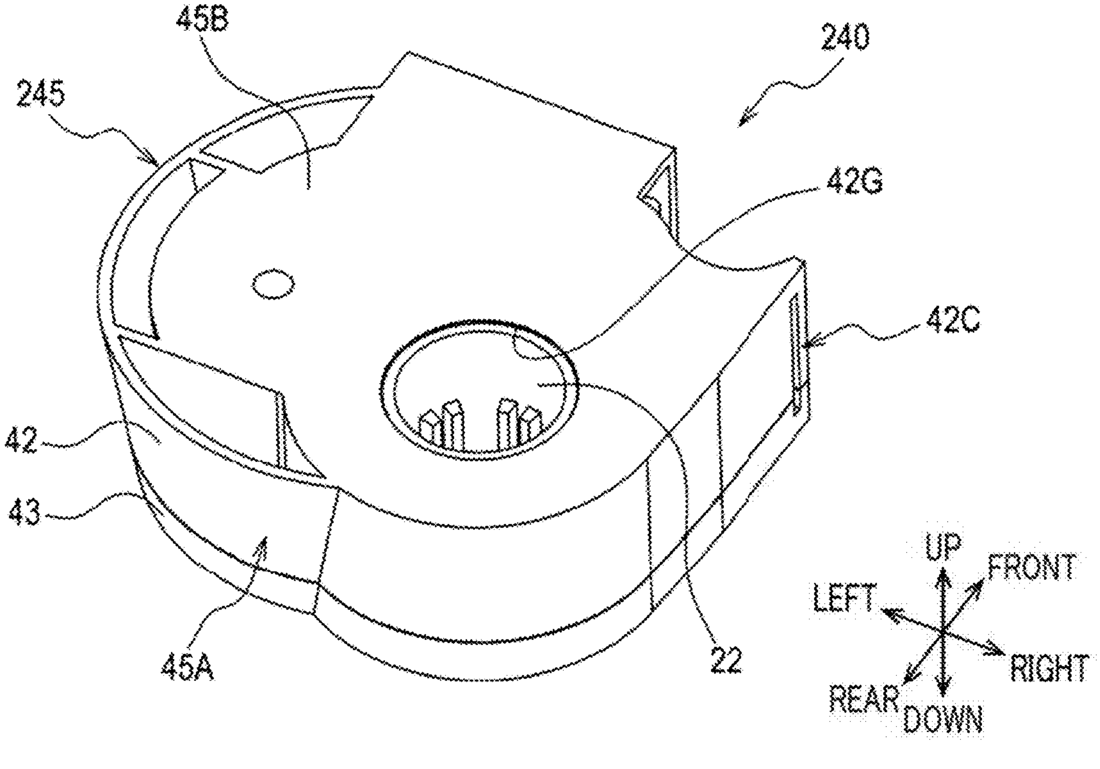

The auxiliary tape cassette 240 shown in FIGS. 10A and 10B is configured by eliminating the third case part 41 and the drive transmission unit 20 from the auxiliary tape cassette 40 in the first embodiment.

The auxiliary tape cassette 240 includes an auxiliary tape case 245 that has the fourth case part 42 and fifth case part 43. The remaining configuration of the auxiliary tape cassette 240 is identical to the auxiliary tape cassette 40 in the first embodiment.

In this embodiment, the top surface of the fourth case part 42 constitutes the second coupling surface 45B on which the printing tape cassette 230 can be arranged. The second coupling surface 45B has an opening 42G into which the input gear 22 of the printing tape cassette 230 can be inserted. The opening 42G constitutes a positioning part for positioning the auxiliary tape cassette 240 relative to the printing tape cassette 230.

Variation of the Second Embodiment

Figure 11:
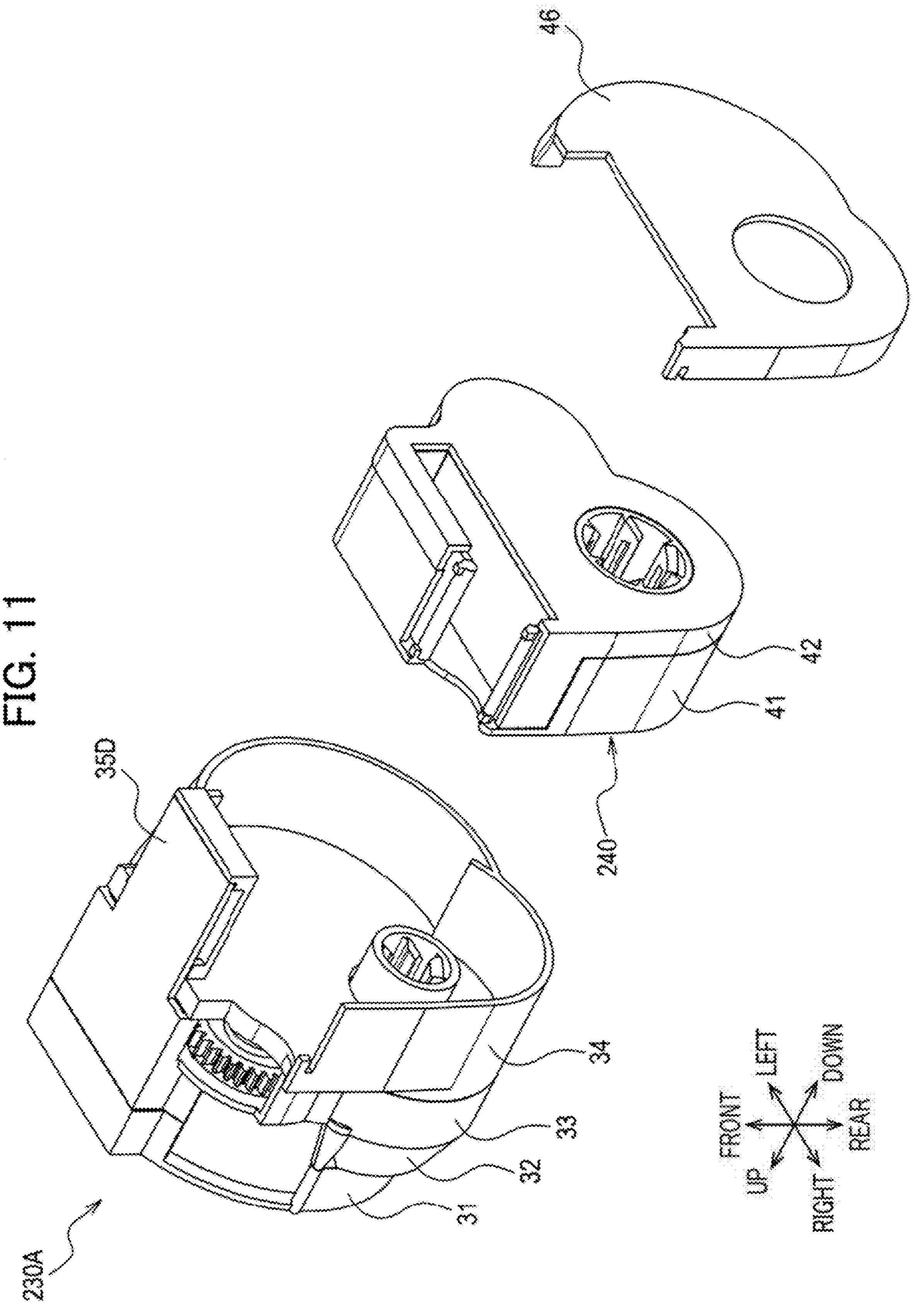
FIG. 11 is a schematic perspective view of a printing cassette.

As shown in FIG. 11, the printing cassette 210 of the second embodiment may include a cassette cover 46 that is arranged below the auxiliary tape cassette 240.

A printing tape cassette 230A shown in FIG. 11 include an arm part 35D similar to that on the printing tape cassette 30A shown in FIG. 7A, and a frame part 34 that forms a space to house the auxiliary tape cassette 240. The cassette cover 46 constitutes a cover for the frame part 34.

2-2. Effects

The following effects can be obtained according to the embodiments described above.

(2a) In addition to the same advantages of the first embodiment, the printing cassette 210 can be configured to enable the ink ribbon 14A to be replaced independently.

3. THIRD EMBODIMENT

3-1. Configuration

Figure 12B:
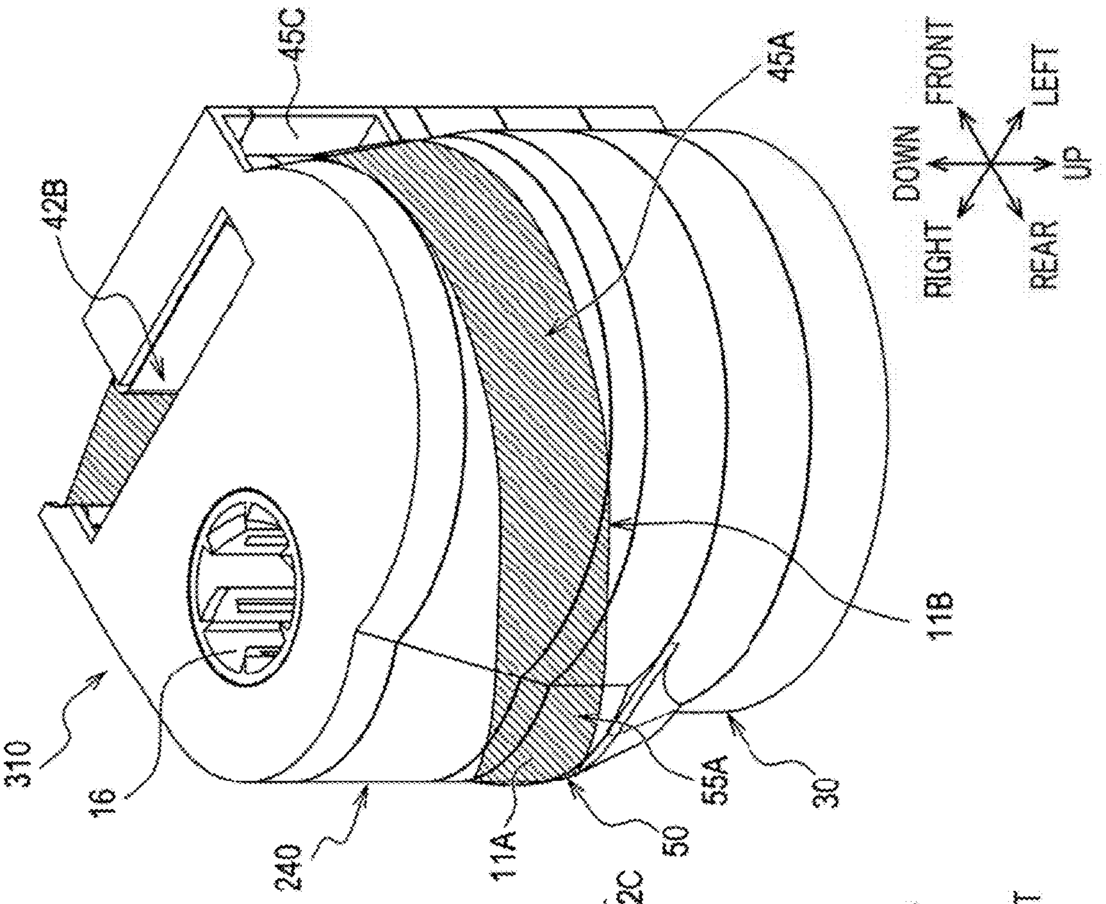
FIGS. 12A and 12B are each a schematic perspective view of a printing cassette.
Figure 12A:
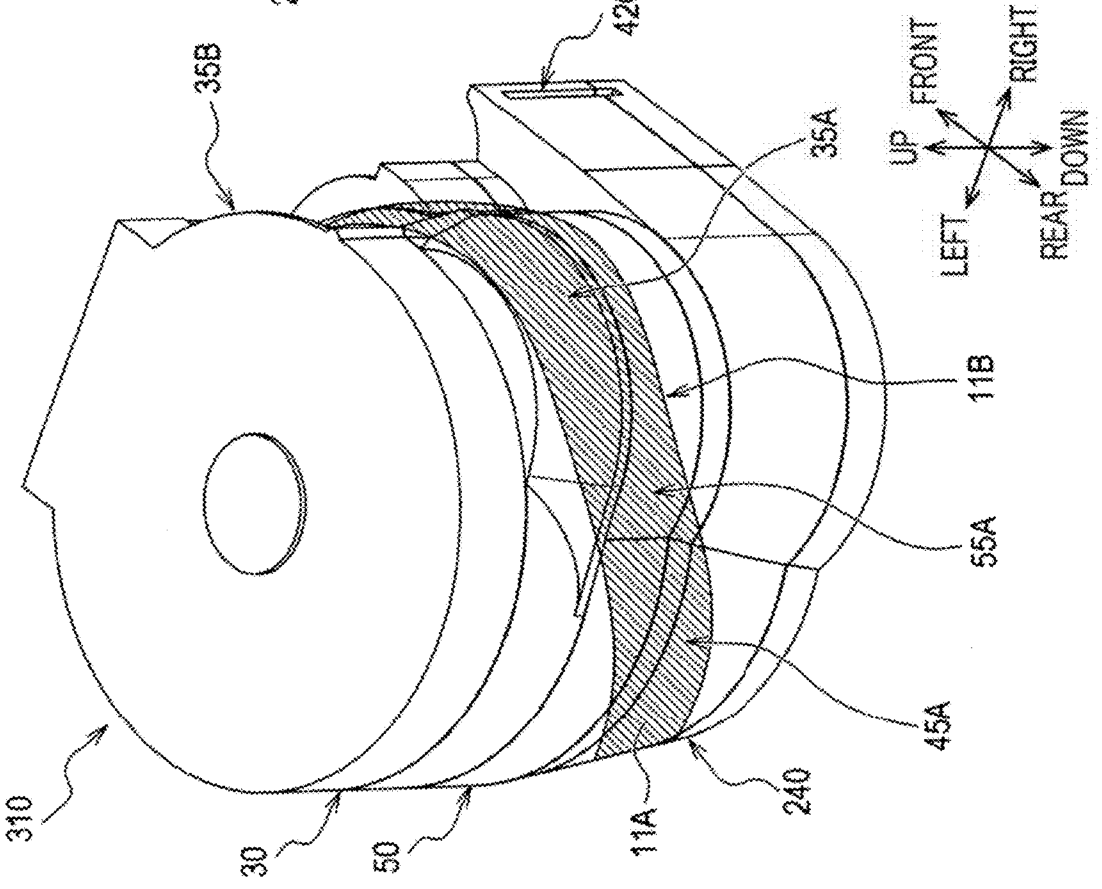

A printing cassette 310 shown in FIGS. 12A and 12B is attached to the printing device body 100 of FIG. 1 in place of the printing cassette 10 according to the first embodiment. The printing cassette 310 includes the printing tape cassette 30, the auxiliary tape cassette 240, and a gear cassette 50.

The printing tape cassette 30 in the printing cassette 310 is identical to that in the first embodiment. The auxiliary tape cassette 240 in the printing cassette 310 is identical to that in the second embodiment.

Gear Cassette

Figure 13:
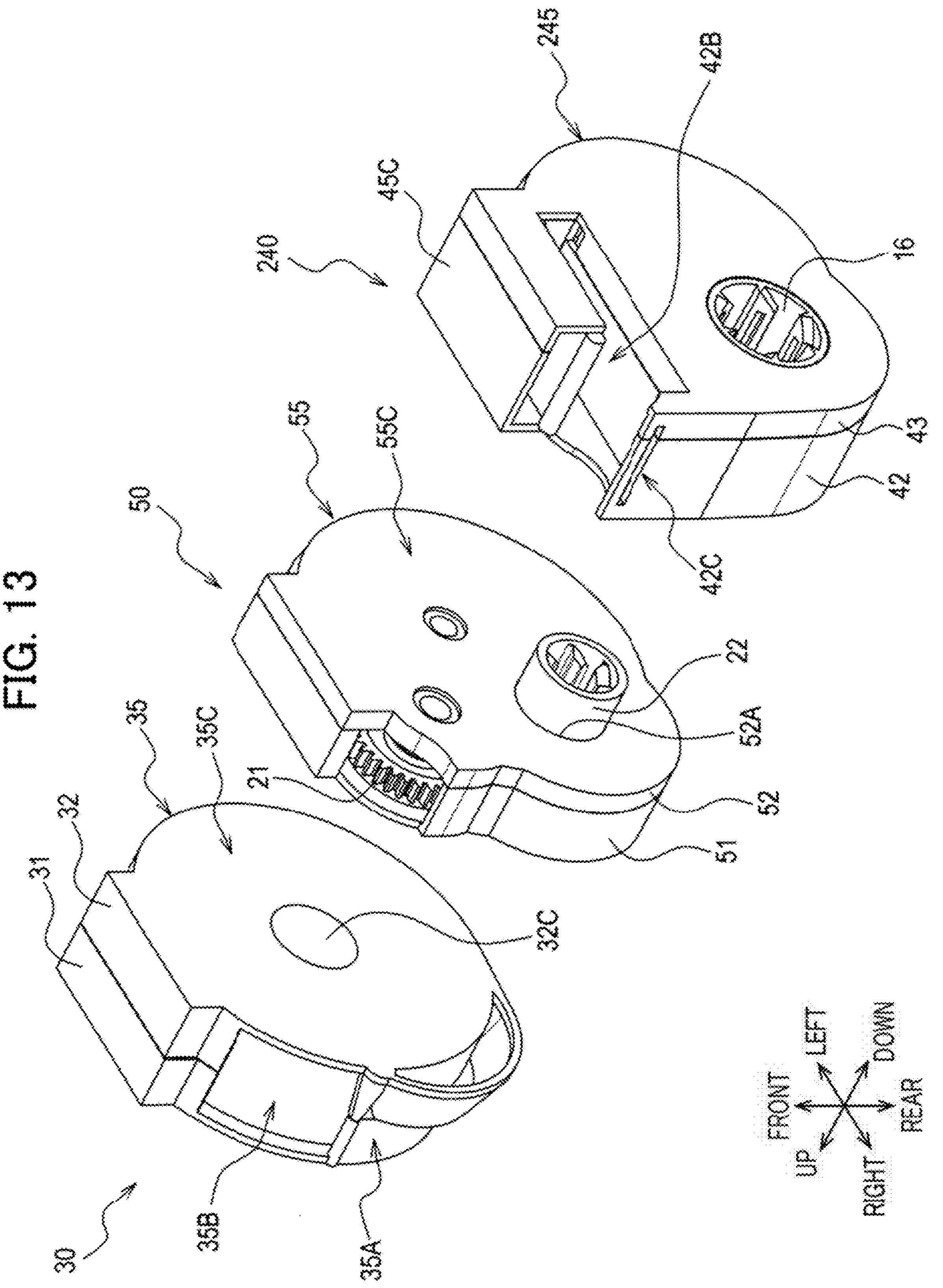
FIG. 13 is a schematic perspective view of a printing tape cassette illustrated in FIG. 12A.

As shown in FIG. 13, the gear cassette 50 is disposed between the printing tape cassette 30 and the auxiliary tape cassette 240. The gear cassette 50 is attachable to and detachable from the printing tape cassette 30. The gear cassette 50 is also attachable to and detachable from the auxiliary tape cassette 240.

Figure 14:
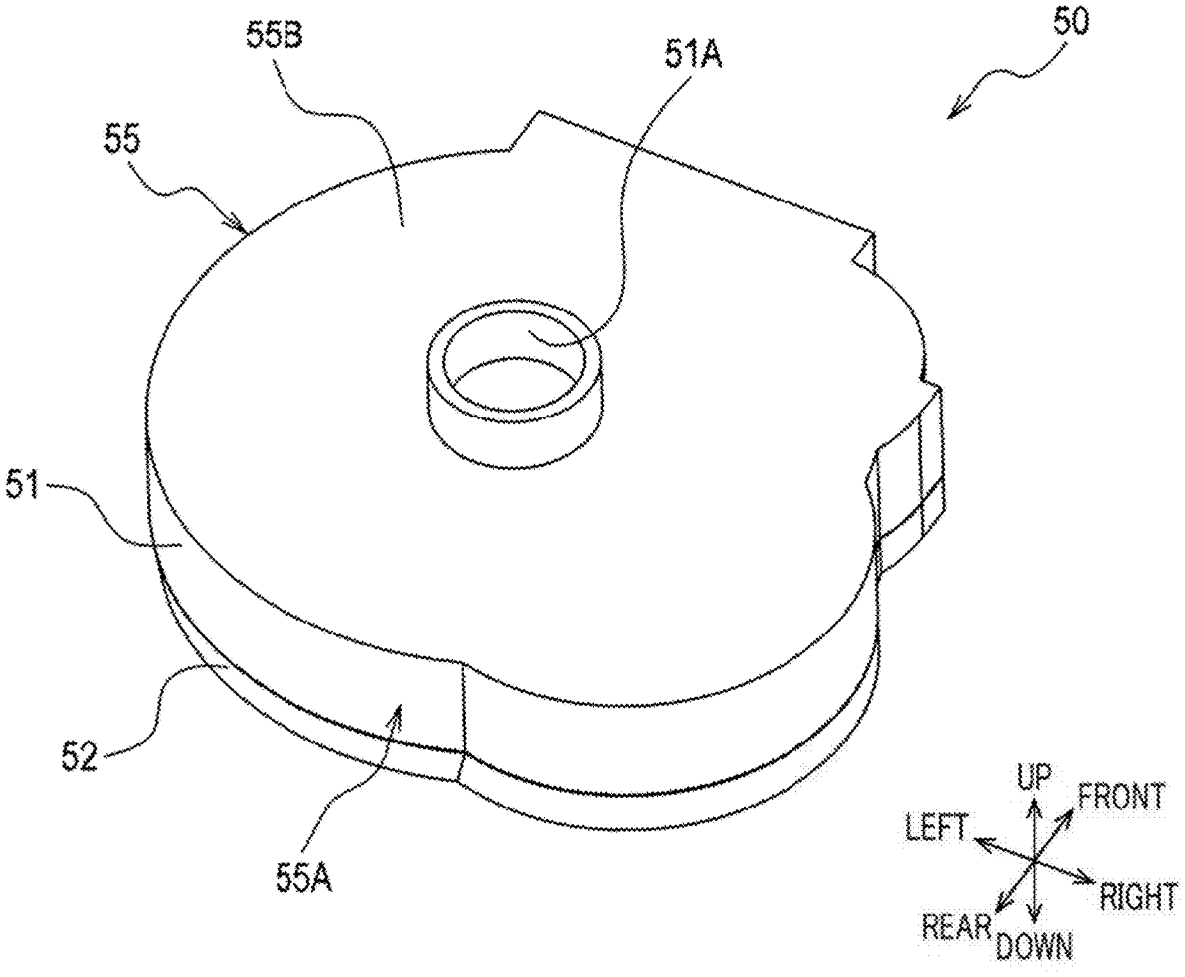
FIG. 14 is a schematic perspective view of a gear cassette illustrated in FIG. 12A.

As shown in FIG. 14, the gear cassette 50 includes a gear case 55 that houses the drive transmission unit 20 of the first embodiment. The gear case 55 has a sixth case part 51, a seventh case part 52, and a third guide surface 55A.

The sixth case part 51 constitutes the upper end portion of the gear case 55. The seventh case part 52 constitutes the lower end portion of the gear case 55 and is coupled to the bottom of the sixth case part 51. The idle gear 23, the input gear 22, and part of the output gear 21 are disposed in a space enclosed by the sixth case part 51 and seventh case part 52.

The sixth case part 51 includes a third positioning part 51A. The third positioning part 51A is provided on a third coupling surface 55B. The third coupling surface 55B faces and contacts the printing tape cassette 30 positioned above the third coupling surface 55B in a state where the gear case 55 is inserted in the cassette accommodation part 101.

The third positioning part 51A is a cylindrical or columnar part that protrudes upward from the third coupling surface 55B. When the gear cassette 50 and printing tape cassette 30 are coupled together, the third positioning part 51A is inserted into the first positioning part 32C of the printing tape case 35.

As shown in FIG. 13, the bottom surface of the seventh case part 52 constitutes a fourth coupling surface 55C on which the auxiliary tape cassette 240 can be arranged. The fourth coupling surface 55C has an insertion hole 52A through which the input gear 22 is inserted in the up-down direction. The gear case 55 includes a fourth positioning part, which is configured of the input gear 22 protruding from the fourth coupling surface 55C.

As shown in FIGS. 12A and 12B, part of the side surface of the gear case 55 formed by the sixth case part 51 and seventh case part 52 constitutes the third guide surface 55A that further guides the printing tape 11A, which has been guided along the first guide surface 35A of the printing tape cassette 30, toward the second guide surface 45A of the auxiliary tape cassette 240. The third guide surface 55A contacts the spiral portion 11B of the printing tape 11A.

3-2. Effects

The following effects are obtained according to the embodiment described above.

(3a) In addition to the same advantages described in the first embodiment, the printing cassette 310 can be configured so that each of the printing tape 11A, drive transmission unit 20, and ink ribbon 14A is individually replaceable.

4. FOURTH EMBODIMENT

4-1. Configuration

Figure 15B:
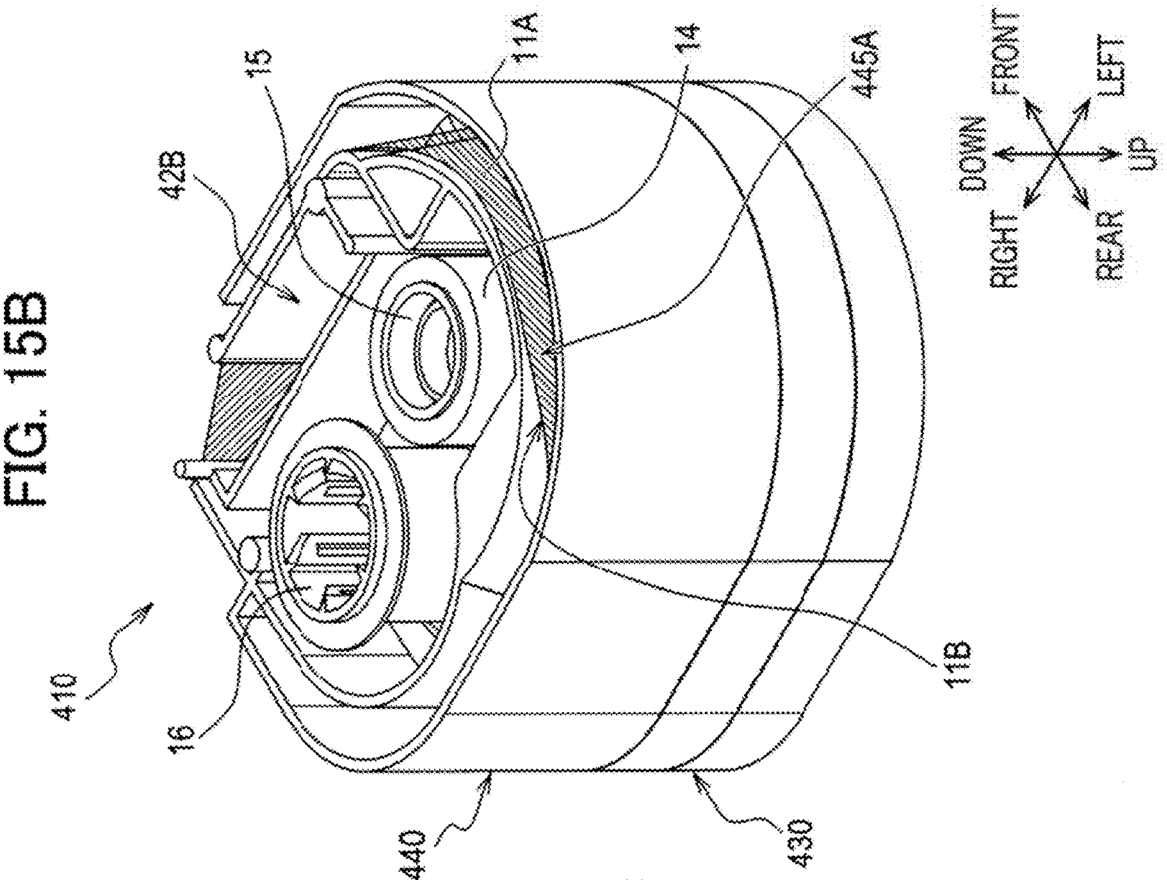
FIGS. 15A and 15B are each a schematic perspective view of a printing cassette.
Figure 15A:
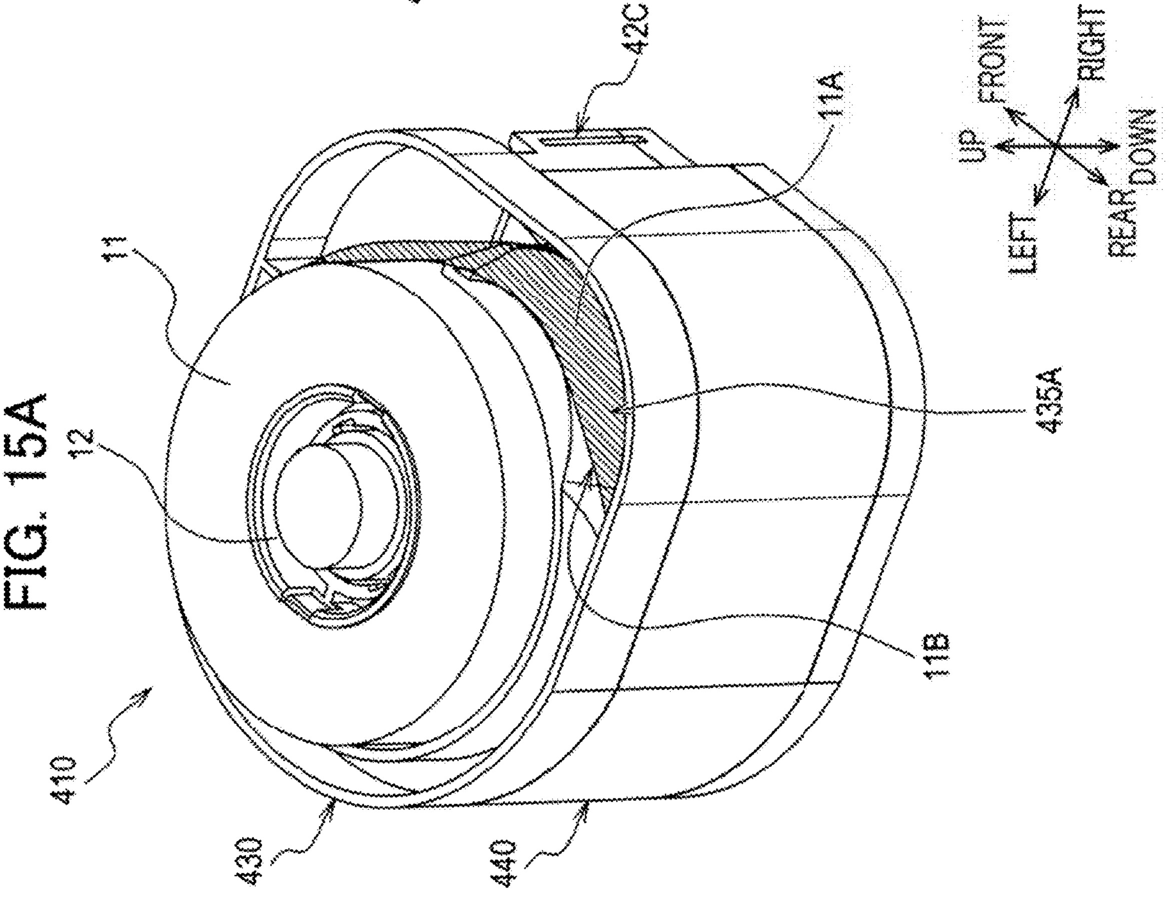

A printing cassette 410 shown in FIGS. 15A and 15B is attached to the printing device body 100 of FIG. 1 in place of the printing cassette 10 according to the first embodiment. The printing cassette 410 includes a printing tape cassette 430, and an auxiliary tape cassette 440.

Note that FIG. 15A shows the state of the printing cassette 410 in which a first case part 431 of the printing tape cassette 430 has been removed. FIG. 15B shows the state of the printing cassette 410 in which a third case part 441 of the auxiliary tape cassette 440 has been removed.

Printing Tape Cassette

Figure 16A:
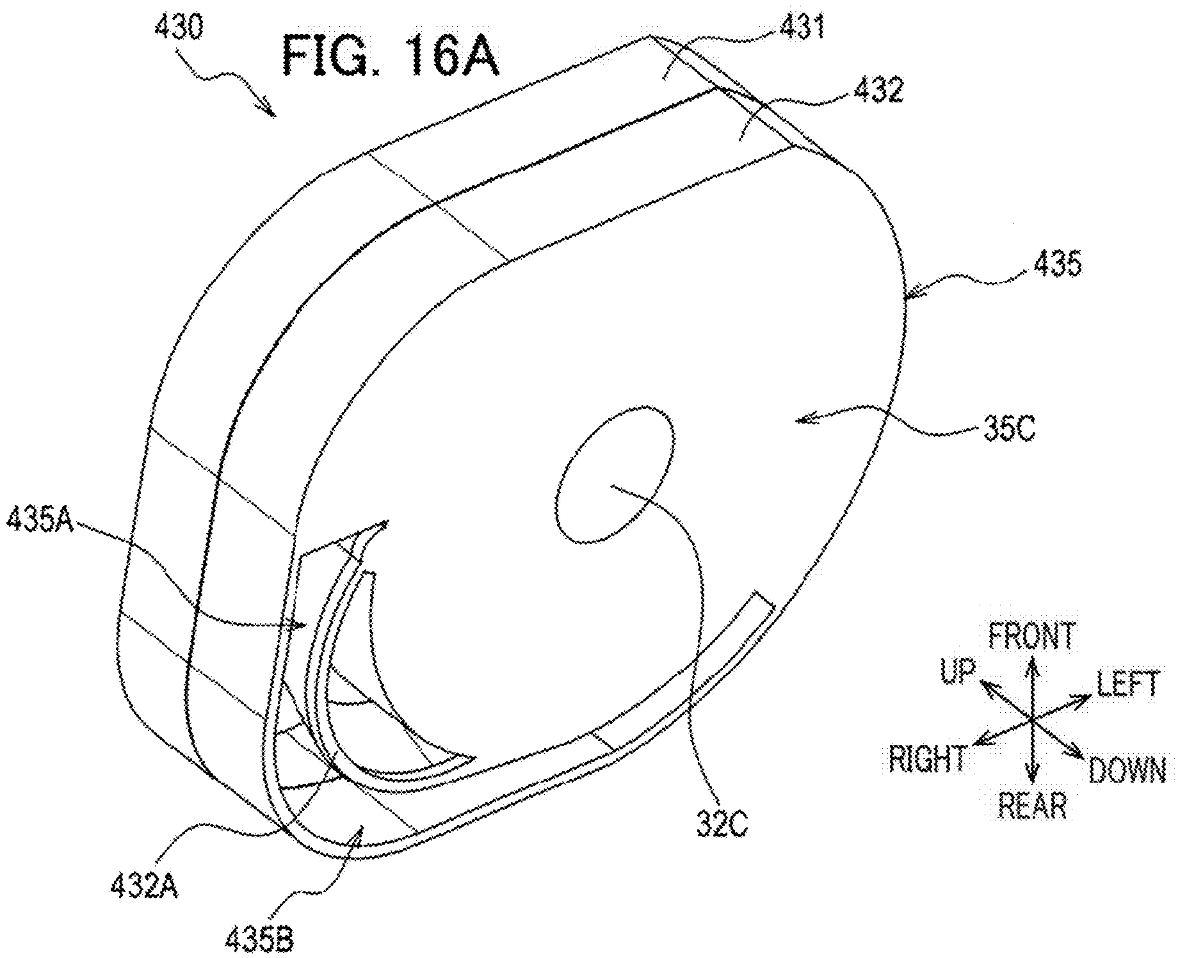
FIGS. 16A and 16B are each a schematic perspective view of a printing tape cassette illustrated in FIG. 15A.
Figure 16B:
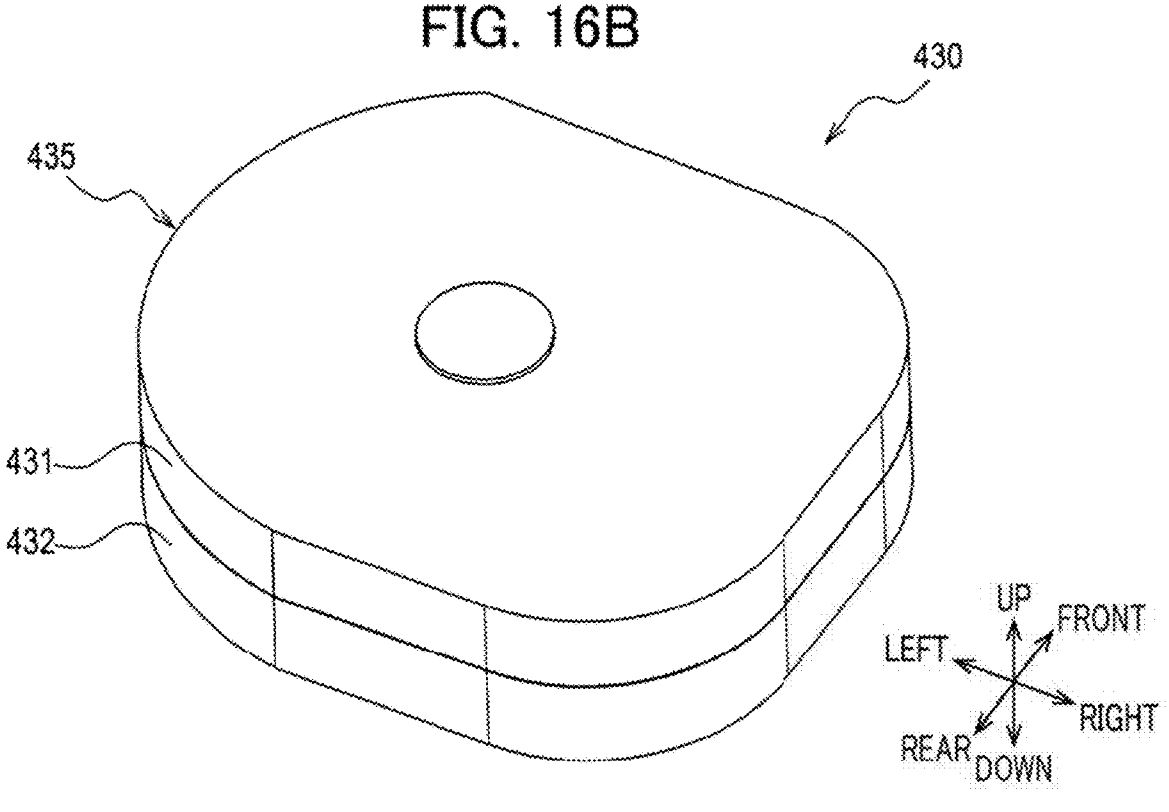

The printing tape cassette 430 shown in FIGS. 16A and 16B includes a printing tape case 435 that houses the printing tape 11A. Parts housed in the printing tape case 435 are the same as those described in the printing cassette 10 of the first embodiment.

The printing tape case 435 has the first case part 431, a second case part 432, a first guide surface 435A, and a first discharge port 435B. The first case part 431 constitutes the upper end portion of the printing tape case 435. The second case part 432 constitutes the lower end portion of the printing tape case 435 and is coupled to the bottom of the first case part 431.

The second case part 432 includes the first positioning part 32C provided on the first coupling surface 35C similar to that in the first embodiment. The second case part 432 also has an inner wall 432A constituting the first guide surface 435A, and an opening constituting the first discharge port 435B. The inner wall 432A surrounds the first roll 11 from the outer radial side.

The first discharge port 435B is provided in the first coupling surface 35C. The first discharge port 435B discharges the printing tape 11A to the outside of the printing tape case 435 in a direction crossing the first coupling surface 35C (i.e., the up-down direction).

As shown in FIG. 15A, the first guide surface 435A guides the printing tape 11A drawn off the first roll 11 toward the first discharge port 435B. The printing tape 11A is wrapped around the first guide surface 435A from the outer radial side of the first roll 11 while forming the spiral portion 11B.

Auxiliary Tape Cassette

Figure 17A:
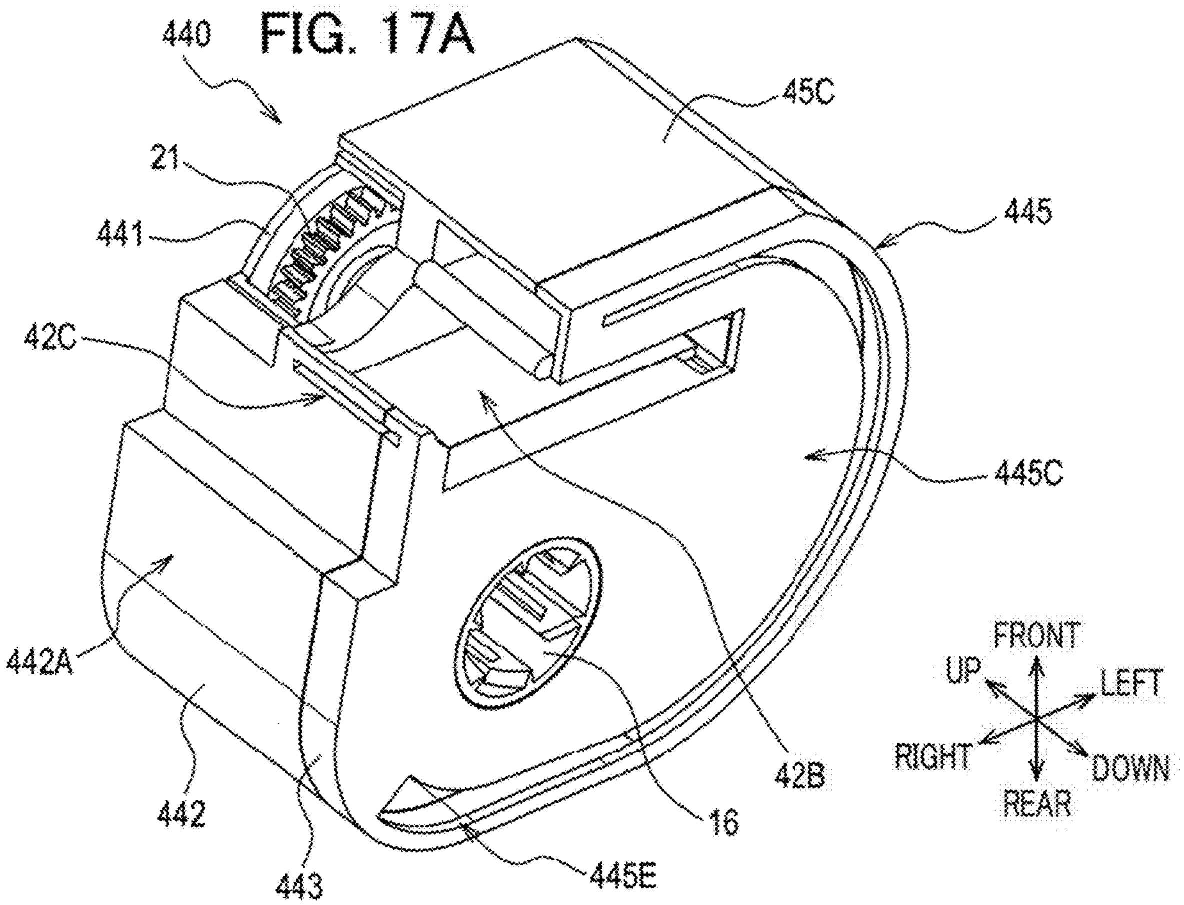
FIGS. 17A and 17B are each a schematic perspective view of an auxiliary tape cassette illustrated in FIG. 15A.
Figure 17B:
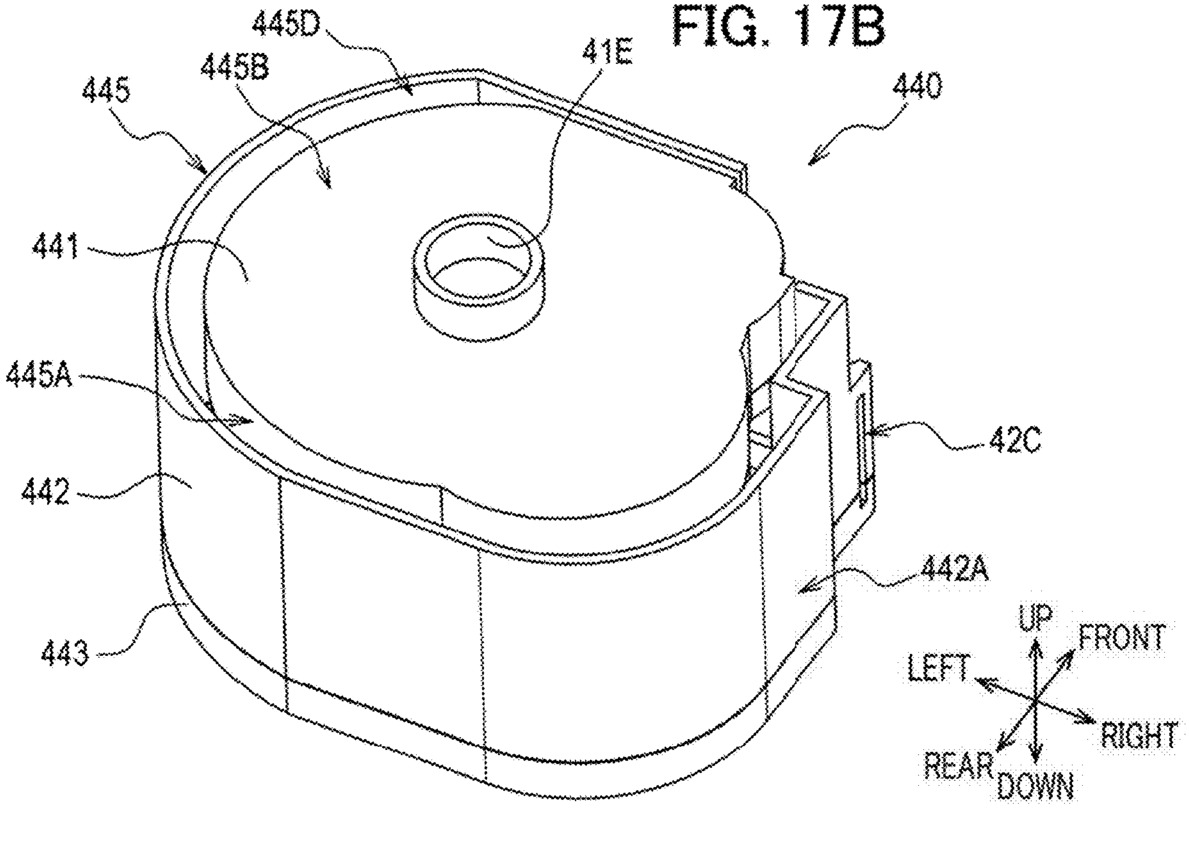

The auxiliary tape cassette 440 shown in FIGS. 17A and 17B includes an auxiliary tape case 445 that houses the ink ribbon 14A and the drive transmission unit 20. Parts housed in the auxiliary tape case 445 are the same as those in the printing cassette 10 of the first embodiment.

The auxiliary tape case 445 has the third case part 441, a fourth case part 442, a fifth case part 443, a second guide surface 445A, a first guide opening 445D, and a second guide opening 445E.

The third case part 441 constitutes the top surface of the auxiliary tape case 445 (i.e., a second coupling surface 445B). The fifth case part 443 constitutes the lower end portion of the auxiliary tape case 445. The fourth case part 442 is coupled to the top of the fifth case part 443.

Figure 18:
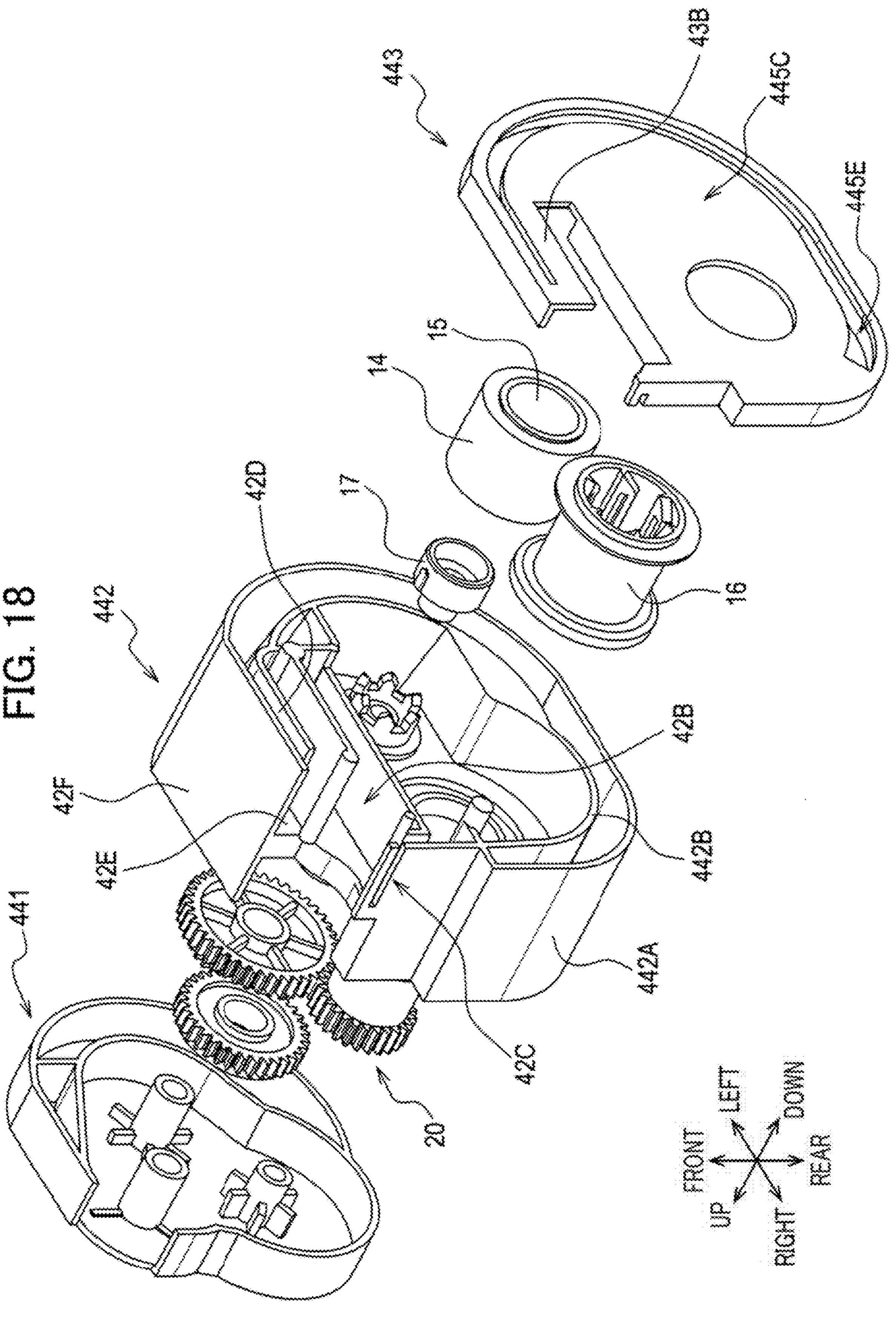
FIG. 18 is a schematic exploded perspective view of the auxiliary tape cassette illustrated in FIG. 17A.

The third case part 441 includes the same second positioning part 41E described in the first embodiment. As shown in FIG. 18, the third case part 441 also supports the drive transmission unit 20. The third case part 441 is fitted inside an outer wall 442A of the fourth case part 442 so as to close off the interior space of the fourth case part 442 from above.

The fourth case part 442 includes the same head opening 42B, second discharge port 42C, inner guide wall 42D, first restricting part 42E, and ceiling wall 42F described in the first embodiment. The fourth case part 442 also has the outer wall 442A, and an inner wall 442B.

The inner wall 442B surrounds the second roll 14, second supply spool 15, and take-up spool 16 from the outer radial side of the second roll 14. Part of the outer surface of the inner wall 442B constitutes the second guide surface 445A.

The outer wall 442A surrounds the inner wall 442B from the outside thereof. As shown in FIG. 17B, the first guide opening 445D is formed at the upper end portion of the auxiliary tape case 445 by the third case part 441 and fourth case part 442. The first guide opening 445D is in communication with the space between the outer wall 442A and inner wall 442B.

The first guide opening 445D is formed in the second coupling surface 445B (an example of the first outer surface) that is coupled to the printing tape cassette 430. The printing tape 11A discharged from the printing tape case 435 through the first discharge port 435B is conveyed into the auxiliary tape case 445 through the first guide opening 445D.

As shown in FIG. 15B, the printing tape 11A fed into the auxiliary tape case 445 is wrapped around the second guide surface 445A from the outer radial side of the second roll 14 while forming the spiral portion 11B.

The fifth case part 443 shown in FIG. 18 includes the same second restricting part 43B described in the first embodiment. The fifth case part 443 also has an opening constituting the second guide opening 445E. The second guide opening 445E is provided in a bottom surface 445C (an example of the second outer surface). The bottom surface 445C sandwiches, in cooperation with the second coupling surface 445B, the second roll 14 in the up-down direction within the auxiliary tape case 445.

The second guide opening 445E is in communication with the space between the outer wall 442A and inner wall 442B of the fourth case part 442. Also, at least a portion of the second guide opening 445E faces the first guide opening 445D. Further, the second guide opening 445E extends along the second guide surface 445A to a position overlapping the arm part 45C (i.e., the inner guide wall 42D) so as to overlap the conveying path of the printing tape 11A in the fourth case part 442 in the up-down direction.

Therefore, the printing tape 11A inserted into the auxiliary tape case 445 through the first guide opening 445D can be placed on the conveying path in the auxiliary tape case 445 while being drawn down to the bottom of the auxiliary tape case 445 through the second guide opening 445E.

Note that the second guide opening 445E does not overlap the entire second roll 14 in the up-down direction. In other words, the second guide opening 445E and the entire second roll 14 are not overlapped as viewed in the up-down direction. That is, the second guide opening 445E is formed in a shape that does not allow the second roll 14 to pass down through the fifth case part 443 and fall out of the auxiliary tape case 445.

4-2. Effects

The following effects can be obtained according to the embodiment described above.

(4a) Providing the first guide surface 435A and the second guide surface 445A on inner surfaces of the respective cases can protect the printing tape 11A.

(4b) The second guide opening 445E enables the printing tape 11A to be placed on the conveying path in the auxiliary tape case 445 while being pulled out of the printing tape cassette 430.

5. OTHER EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(5a) The printing device in the above embodiments is not limited to a device that prints with an ink ribbon. In place of the printing tape, the printing device may use a strip of thermal paper. In this case, a laminated tape may be used as the auxiliary tape, for example.

(5b) The printing cassette in the above embodiments need not necessarily be provided with a printing tape cassette. For example, a printing cassette 510 shown in FIG. 19 includes a first case part 531, a second case part 532, and a third case part 533. The first case part 531 supports the first roll 11. The second case part 532 houses the drive transmission unit 20 in cooperation with the first case part 531. The third case part 533 houses the second roll 14 in cooperation with the second case part 532.

Figure 19:
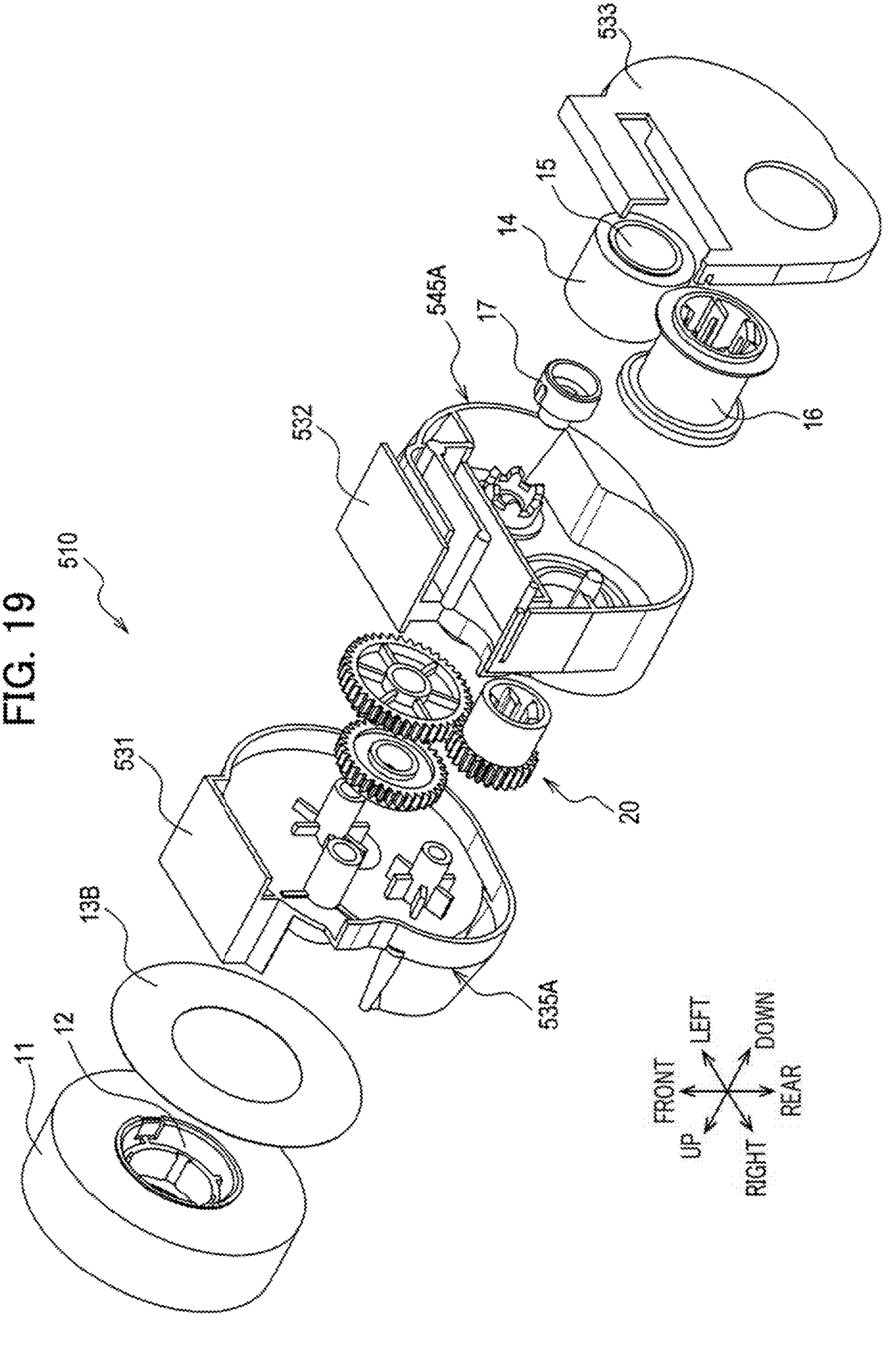
FIG. 19 is a schematic perspective view of a printing cassette.

In the printing cassette 510 of FIG. 19, the first case part 531, second case part 532, and third case part 533 constitute an auxiliary tape cassette, and the first roll 11 is attachable to and detachable from the auxiliary tape cassette. Accordingly, the first roll 11 can be replaced independently without having to replace the printing tape cassette.

In the printing cassette 510 of FIG. 19, the side surface of the first case part 531 constitutes a first guide surface 535A, and the side surface of the second case part 532 constitutes a second guide surface 545A.

(5c) In the printing cassettes of the embodiments described above, a guide surface may be defined on the inner surface of one of the printing tape cassette and the auxiliary tape cassette and a guide surface may be defined on the outer surface of the other of the printing tape cassette and the auxiliary tape cassette.

Figure 20A:
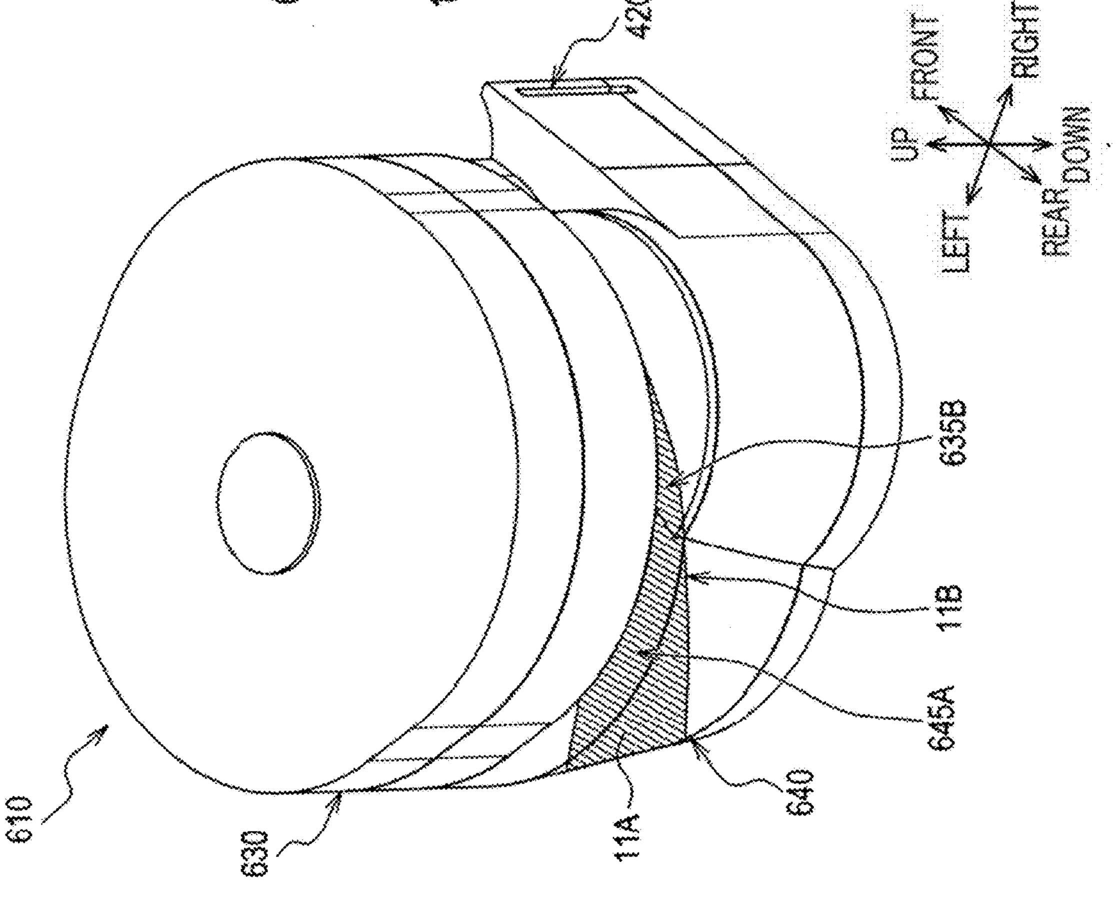
FIGS. 20A and 20B are each a schematic perspective view of a printing cassette.
Figure 20B:
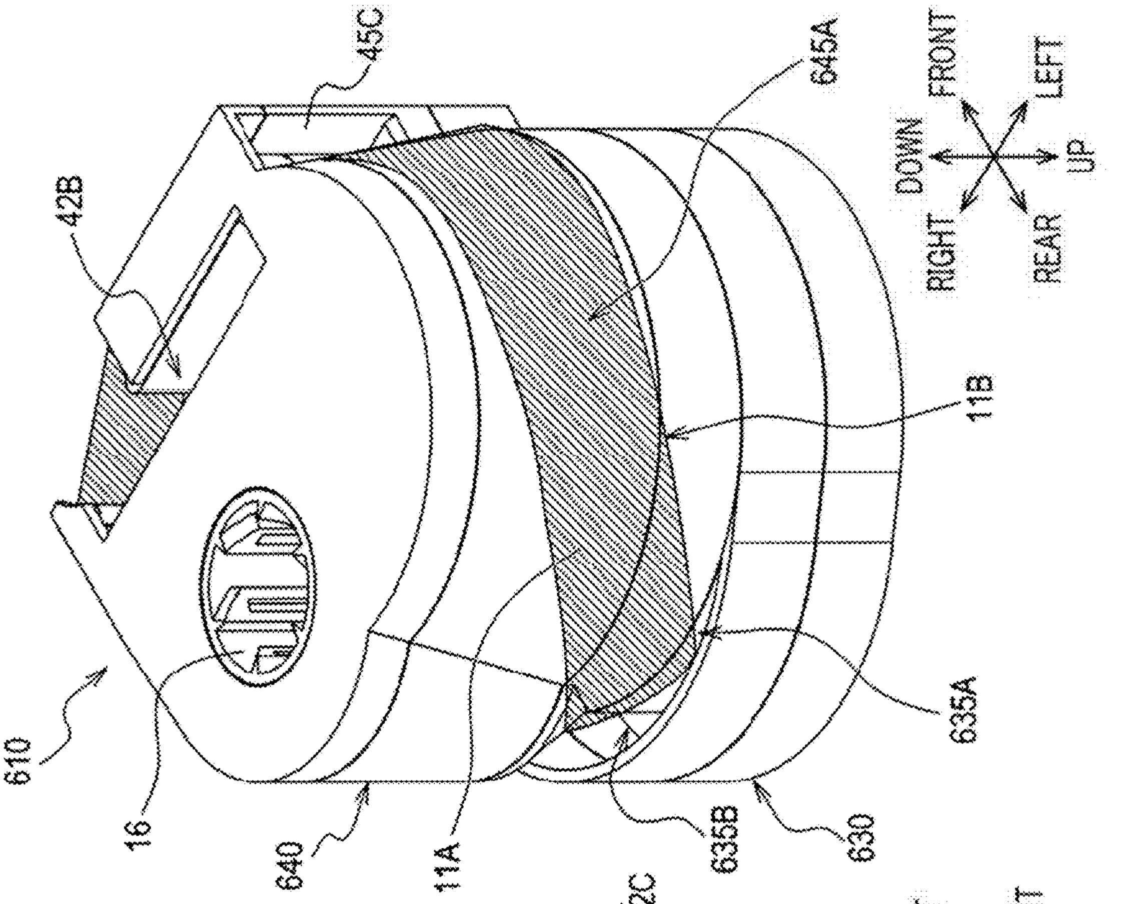

For example, a printing cassette 610 shown in FIGS. 20A and 20B includes a printing tape cassette 630 and an auxiliary tape cassette 640. A first guide surface 635A is defined on the inner surface of the case for the printing tape cassette 630, and a second guide surface 645A is defined on the outer surface of the case for the auxiliary tape cassette 640.

The printing tape 11A guided along the first guide surface 635A and discharged downward from a first discharge port 635B of the printing tape cassette 630 is conveyed to the head opening 42B through the arm part 45C while being guided along the second guide surface 645A.

Figure 21A:
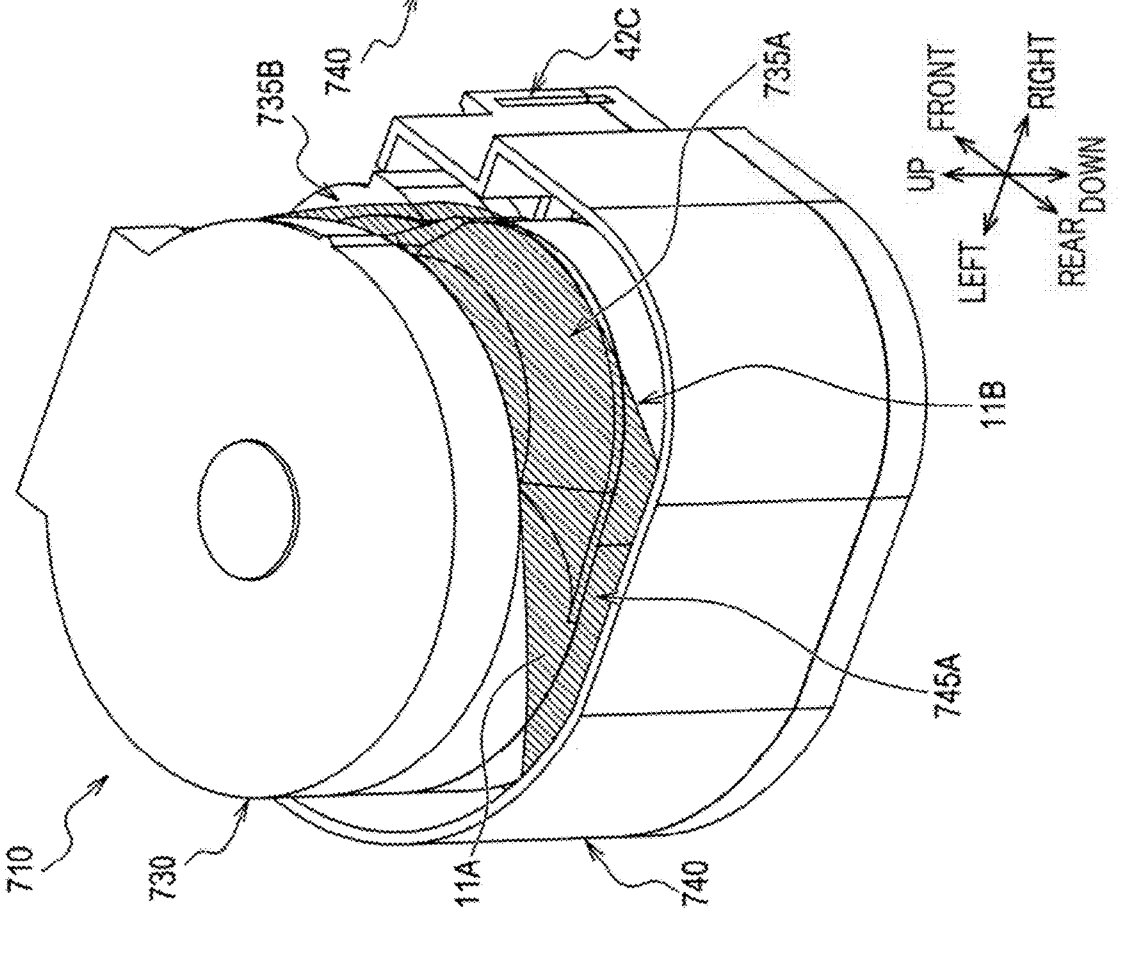
FIGS. 21A and 21B are each a schematic perspective view of a printing cassette.
Figure 21B:
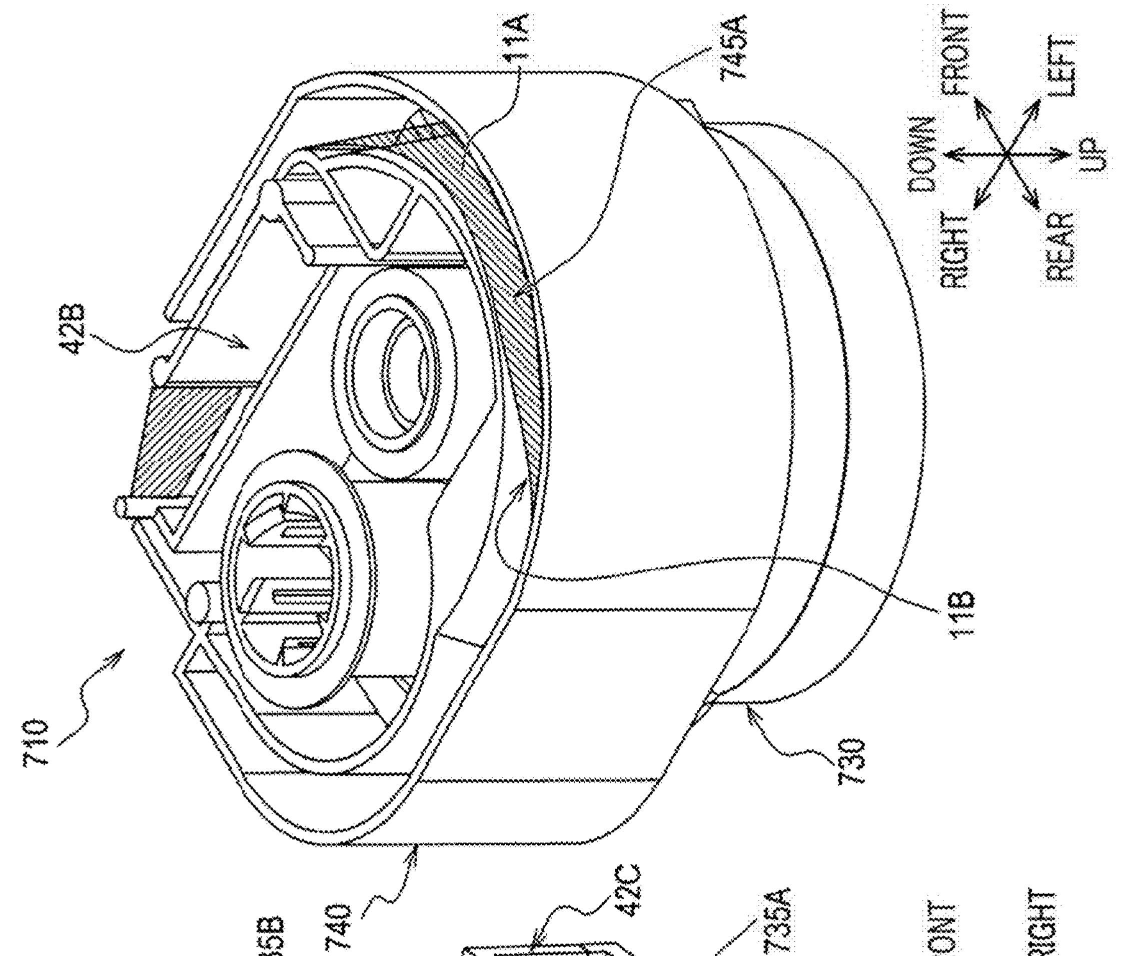

Alternatively, a printing cassette 710 shown in the example of FIGS. 21A and 21B is provided with a printing tape cassette 730, and an auxiliary tape cassette 740. A first guide surface 735A is defined on the outer surface of the case of the printing tape cassette 730, while a second guide surface 745A is defined on the inner surface of the case of the auxiliary tape cassette 740.

The printing tape 11A discharged from a first discharge port 735B of the printing tape cassette 730 is guided along the first guide surface 735A and second guide surface 745A and conveyed to the head opening 42B.

(5d) The printing cassettes in the above embodiments need not necessarily be provided with an arm part. That is, the cases of the printing tape cassette and auxiliary tape cassette need not necessarily possess: restricting parts that restrict the printing tape conveyed along the guide surfaces from moving in the width direction of the printing tape; and restricting surfaces facing the guide surfaces.

(5e) Functions possessed by a single component in the embodiments described above may be distributed among a plurality of components, and functions possessed by a plurality of components may be integrated into a single component. Additionally, some of the structures in the embodiments described above may be omitted. Further, at least some of the structures in the embodiments may be added to or used in place of structures in other embodiments. All aspects included in the technical concepts identified from descriptions in the claims are embodiments of the present disclosure.

What is claimed is:

1. An auxiliary tape cassette comprising:

a roll configured of an auxiliary tape wound about a winding axis, the auxiliary tape being used for printing on a printing tape that is conveyed; and a case housing the roll and having:

a discharge port for discharging the printing tape from inside the case to outside the case in a discharging direction; and a guide surface for guiding toward the discharge port the printing tape supplied from outside the case, the guide surface being defined on an inner surface or an outer surface of the case, wherein the printing tape is wrapped around the guide surface to form a spiral portion whose angle of rotation about a central axis of the spiral portion is greater than or equal to 180 degrees, the central axis being parallel to the winding axis of the roll, and wherein the guide surface includes a curved surface for guiding at least a portion of the spiral portion on an upstream side of the discharge port in the discharging direction of the printing tape.

2. The auxiliary tape cassette according to claim 1, wherein the curved surface has a radius of curvature that is greater than one half an outer diameter of the roll.

3. The auxiliary tape cassette according to claim 1, wherein the case has a tape cassette coupling surface crossing the winding axis of the roll, and wherein the case includes a positioning part that positions the auxiliary tape cassette relative to a printing tape cassette including the printing tape, the positioning part being provided on the tape cassette coupling surface.

4. The auxiliary tape cassette according to claim 1, wherein the case has a gear cassette coupling surface on which a gear cassette including a gear can be arranged, the gear cassette coupling surface crossing the winding axis of the roll.

5. The auxiliary tape cassette according to claim 4, wherein the case includes a positioning part that positions the auxiliary tape cassette relative to the gear cassette, the positioning part being provided on the gear cassette coupling surface.

6. The auxiliary tape cassette according to claim 1, further comprising:

a gear disposed in the case so as to be separated from the roll in a direction parallel to the winding axis of the roll.

7. The auxiliary tape cassette according to claim 1, wherein the case includes a restricting part for restricting the printing tape being conveyed along the guide surface from moving in a width direction of the printing tape.

8. The auxiliary tape cassette according to claim 7, wherein the case has a restricting surface disposed so as to face the guide surface.

9. The auxiliary tape cassette according to claim 1, wherein the guide surface is defined on the inner surface of the case, and wherein the case has:

a first outer surface crossing the winding axis of the roll;

a second outer surface sandwiching, in cooperation with the first outer surface, the roll in a direction parallel to the winding axis of the roll;

a first guide opening formed in the first outer surface; and a second guide opening formed in the second outer surface at a position facing the first guide opening.

10. A printing tape cassette comprising:

a roll configured of a printing tape wound about a winding axis; and a case housing the roll and having:

a discharge port for discharging the printing tape to outside the case; and a guide surface for guiding the printing tape discharged through the discharge port, wherein the printing tape is wrapped around the guide surface to form a spiral portion whose angle of rotation about a central axis of the spiral portion is greater than or equal to 180 degrees, the central axis being parallel to the winding axis of the roll.

11. The printing tape cassette according to claim 10, wherein the case has a coupling surface on which a gear cassette including a gear can be arranged, the coupling surface crossing the winding axis of the roll.

12. The printing tape cassette according to claim 11, wherein the case includes a positioning part that positions the printing tape cassette relative to the gear cassette, the positioning part being provided on the coupling surface.

13. The printing tape cassette according to claim 10, further comprising:

a gear disposed in the case so as to be separated from the roll in a direction parallel to the winding axis of the roll.

* * * * *